(12) United States Patent
Dove et al.

(10) Patent No.: US 11,649,318 B2
(45) Date of Patent: May 16, 2023

(54) BIOCOMPATIBLE MATERIALS

(71) Applicant: 4D Medicine Limited, Birmingham (GB)

(72) Inventors: Andrew Dove, Birmingham (GB); Andrew Weems, Birmingham (GB)

(73) Assignee: 4D MEDICINE LIMITED, Birmingham (GB)

( * ) Notice: Subject to any disclaimer, the term of this patent is extended or adjusted under 35 U.S.C. 154(b) by 46 days.

(21) Appl. No.: 16/621,506

(22) PCT Filed: Jun. 4, 2018

(86) PCT No.: PCT/GB2018/051521
§ 371 (c)(1),
(2) Date: Dec. 11, 2019

(87) PCT Pub. No.: WO2018/229456
PCT Pub. Date: Dec. 20, 2018

(65) Prior Publication Data
US 2020/0115490 A1    Apr. 16, 2020

(30) Foreign Application Priority Data

Jun. 12, 2017   (GB) .................................... 1709287

(51) Int. Cl.
*C08G 18/44* (2006.01)
*C08G 18/75* (2006.01)
*C08G 18/70* (2006.01)
*C08G 18/81* (2006.01)
*C08G 18/38* (2006.01)

(52) U.S. Cl.
CPC ....... *C08G 18/755* (2013.01); *C08G 18/3876* (2013.01); *C08G 18/44* (2013.01); *C08G 18/702* (2013.01); *C08G 18/8166* (2013.01)

(58) Field of Classification Search
CPC .. C08G 18/44; C08G 18/755; C08G 18/8166; C08G 18/702; C08G 18/3876
See application file for complete search history.

(56) References Cited

U.S. PATENT DOCUMENTS 6,043,334 A    3/2000   Kanamaru et al.
6,194,124 B1   2/2001   Choi et al.
(Continued)

FOREIGN PATENT DOCUMENTS

WO    WO-2017110647 A1 *  6/2017  .............. C08L 75/16

OTHER PUBLICATIONS

International Preliminary Report on Patentability and Written Opinion dated Dec. 26, 2019 in corresponding International Application No. PCT/GB2018/051521, 11 pages.
(Continued)

*Primary Examiner* — Michael L Leonard
(74) *Attorney, Agent, or Firm* — Nixon & Vanderhye PC

(57) ABSTRACT

A resin composition, the resin composition comprising a prepolymer (209) and optionally one or more diluent(s) (FIG. 3A), the prepolymer (209) comprising repeating units having at least one carbonate linkage and at least one unsaturated side-chain, the at least one optional diluent(s) comprising at least one unsaturated side-chain, wherein either or both of the prepolymer (209) and the at least one optional diluent(s) comprises at least one O═C—N linkage, preferably a urethane linkage.

22 Claims, 18 Drawing Sheets

(56) References Cited

U.S. PATENT DOCUMENTS

| | | | |
|---|---|---|---|
| 6,248,860 B1 | 6/2001 | Sant' Angelo et al. | |
| 8,883,871 B2 | 11/2014 | Wilson et al. | |
| 9,540,481 B2 | 1/2017 | Wilson et al. | |
| 2001/0008906 A1* | 7/2001 | Chawla | C03C 25/106 522/182 |
| 2006/0089453 A1* | 4/2006 | Pajerski | C08G 18/36 524/589 |
| 2011/0039967 A1 | 2/2011 | Wilson et al. | |
| 2012/0294845 A1 | 11/2012 | Chen et al. | |
| 2014/0249268 A1 | 9/2014 | Zhong et al. | |
| 2015/0087790 A1 | 3/2015 | Harth et al. | |
| 2015/0277031 A1* | 10/2015 | Bookbinder | G02B 6/02395 385/115 |
| 2018/0364398 A1* | 12/2018 | Iwase | G02B 1/14 |
| 2018/0371291 A1* | 12/2018 | Urata | B32B 25/08 |

OTHER PUBLICATIONS

International Search Report and Written Opinion of the ISA for PCT/GB2018/051521, dated Jul. 19, 14 pages.

I. A. Barker et al., "A microstereolithography resin based on thiol-ene chemistry: towards biocompatible 3D extracellular constructs for tissue engineering," Biomaterials Science, Apr. 2014, vol. 2, No. 4, pp. 472-475.

J. D. Erndt-Marino et al., "Evaluation of the Osteoinductive Capacity of Polydopamine-Coated Poly(ε-caprolactone) Diacrylate Shape Memory Foams," ACS Biomaterials Science & Engineering, Oct. 2015, 1 (12), pp. 1220-1230.

Y. He et al., "Synthesis, characterization, and application of a bifunctional coupler containing a five- and a six-membered ring carbonate," Reactive and Functional Polymers, vol. 71, Issue 2, Feb. 2011, pp. 175-186.

Ya-Rong Zhang et al., "Review of research on the mechanical properties of the human tooth," International Journal of Oral Science, Apr. 2014, 6(2), pp. 61-69.

R. M. Baker et al, "Self-deploying shape memory polymer scaffolds for grafting and stabilizing complex bone defects: A mouse femoral segmental defect study," Biomaterials, Jan. 2016, 76, pp. 388-398.

Javier Palacio-Torralba et al., "Quantitative diagnostics of soft tissue through viscoelastic characterization using time-based instrumented palpation", *Journal of the Mechanical Behavior of Biomedical Materials*, vol. 41, Jan. 2015, pp. 149-160.

Robert J. Morrison et al., "Mitigation of tracheobronchomalacia with 3D-printed personalized medical devices in pediatric patients", *Science Translation Medicine*, vol. 7, Issue 285, Apr. 29, 2015, 12 pages.

* cited by examiner

SI Figure. IPDI Diallyl in CDCl$_3$

BIOCOMPATIBLE MATERIALS

This application is the U.S. national phase of International Application No. PCT/GB2018/051521 filed 4 Jun. 2018, which designated the U.S. and claims priority to GB Patent Application No. 1709287.5 filed 12 Jun. 2017, the entire contents of each of which are hereby incorporated by reference.

This invention relates generally to biocompatible materials. More specifically, although not exclusively, this invention relates to novel resin compositions for the fabrication of cross-linked polymers that are biocompatible and, in some cases, exhibit shape memory properties, methods of fabricating the same, uses of and devices comprising the same.

There is a clear need for biocompatible materials for use in the body. There is a further need for materials which have tunable physical or mechanical properties and/or which, when located within the body, have non-toxic degradation properties or products (for example materials which have non-acidic degradation properties or products).

Shape memory polymers (SMPs) are a class of programmable, stimuli-responsive materials that exhibit shape-changing transformations in response to exposure to external stimuli. Objects fabricated from SMPs are formed in an original primary shape which may be deformed into a metastable secondary shape, which, upon exposure to an appropriate stimulus, reverts to the original primary shape. Examples of appropriate stimuli include heating (direct or indirect), for example Joule heating, radiation and laser heating, microwaves, pressure, moisture, the presence or absence of solvent or solvent vapours, and/or change in pH.

SMPs have been considered for use in a variety of applications including medicine, aeronautics, textiles, and automotive applications. SMPs have been proposed or used, for example, in self-healing systems, self-deployable structures, actuators and sensors.

Several polymer systems have previously been shown to have shape memory properties. For example, U.S. Pat. No. 9,540,481B2 and U.S. Pat. No. 8,883,871B2 describe polyurethane based shape memory polymers wherein the intermediate thermoplastic polymer is injection moulded before undergoing post-polymerisation cross-linking to produce a thermoset plastic to 'fix' the shape memory material into a desired shape.

An area of particular interest for SMPs is their use in biomedical applications, for example, in the fabrication of stimuli-responsive biomaterials and/or medical devices. This is particularly interesting because a medical device, e.g. a tissue scaffold, may be produced in a desired 'original' shape, which is subsequently deformed into a minimally invasive (or at least 'less invasive') secondary shape that is deliverable with minimal (or less) trauma to the patient. Once the device, e.g. a tissue scaffold or stent, is in place, a stimulus such as body heat, causes the device to revert to its 'original' primary shape, e.g. expanding to a desired shape to perform its function and/or to exert force on the surrounding tissue.

However, to date, many devices that have been fabricated from SMPs for use in medical applications exhibit a number of drawbacks.

For example, in the use of SMPs in tissue scaffolds, it has been suggested that homogeneity of pore size, i.e. homogeneous morphology, is an important factor for successful outcomes. Traditional manufacturing techniques proposed for fabricating scaffolds with high porosities include templating, electrospinning and foaming. However, one major limitation with these techniques is that morphological heterogeneity is observed across the scaffold material. Additionally, scaffolds fabricated using these techniques may have fewer interconnected pores after processing than theorised. Ideal pore sizes have been found to range from between 100 to 700 µm. It would be advantageous for the pore connectivity and size to be tunable for specific applications. For example, pore sizes of 100 µm will promote chondrogenesis (the process by which cartilage is formed from condensed mesenchyme tissue), whereas pore sizes of 400 to 500 µm will promote osteogenesis (the formation of bone) without initial cartilage formation and vascularisation. Pore size has also been shown to be important to allow control over biomolecules such as proteins found in healing processes, e.g. osterocalcin, osteopontin, collagen, bone morphogenetic protein, and bone sialoprotein mRNA expressions. In addition, it has been shown that a specific pore size is important in each of the rate of bone formation, cell proliferation rates, and production of different tissue types. The ability to control the connectivity of pores within porous scaffolds has also been shown to be significant in the control of cellular scaffold mineralisation, resulting in faster bone growth. In contrast, uncontrolled or untailored pore design can result in non-native tissue infiltration, such as connective tissue forming instead of bone.

Shape Memory Medical Inc. has proposed porous biomaterials fabricated from a gas blown foam containing polyurethane urea linkages, e.g. US2011/0039967. These materials are cross-linked and provide biostable materials. The synthesis of these foams involves the use of condensation reactions that produce widely variable polymer structures, despite the crosslinked nature of the bulk material, and inclusion of water for gas blowing adds another layer of ambiguity to the synthesis, by producing a material that is heterogeneous across the batch in terms of morphology, composition, and performance.

We believe that foams do not possess the morphological regularity necessary to have reproducible performance. In addition, these materials are assumed not to degrade.

Other types of foams and porous scaffolds have also been developed for the treatment of aneurysms and/or orthopaedic applications are limited in their utility by their transition temperatures and low elastic moduli (typically below 2 MPa), as well as their inconsistent morphologies, and may be further limited by the production of toxic by-products from material degradation. In one particular study performed on mice (R M Baker et al, Biomaterials, 2016, 76, 388-398), 12 weeks was required to achieve integration of a self-deploying SMP scaffold with the bone; pore size between voids was approximated at 50 µm, which may have limited cellular and nutrient migration. Whilst composites may be used to overcome mechanical limitations, there is a need, particularly in orthopaedic materials, for polymeric materials with appropriate mechanical strength and degradability that do not inherently require compositing materials.

Therefore, in the production of medical devices and biomaterials, it would be highly advantageous to be able to achieve precise scaffold shapes (geometries) and properties, by controlling pore size, homogeneity, and interconnectivity, for specific applications. This has the potential to lead to a reduction in healing time for an improved quality of life.

One alternative method for fabricating devices comprising SMPs is additive manufacturing, so-called '3D printing'. This allows the creation of complex geometries with precisely prescribed microarchitectures that can be designed to provide devices with favourable mechanical, chemical, and topological properties, which respond to applied stimuli in a predictable way. The 3D printed object comprising an SMP may be deformed from its first or primary original shape, into a secondary final or 'permanent' shape using an appropriate stimulus, in a process termed '4D printing'.

4D printing has been proposed for a variety of applications, including tissue scaffolds, hydrogels, and materials beyond the biomedical scope. However, the limitations found for traditionally processed SMPs are still present in these formulations, such limited mechanical properties further requiring the use of additives. These same material failings have also been translated into more additive manufacturing processes, where similar or the same formulations have been utilized without correcting for their limitations.

For example, one particular target in this area is 4D printing of implantable devices in biomedical applications such as tissue scaffolds. Printing of porous scaffolds for biomedical applications has been a goal for additive manufacturing since its introduction. Ideal scaffold designs have not been established, but the diffusion of nutrients, waste and cells requires open pores of scaffolds, with maximum porosities suggested where possible; mechanical stability of the scaffolds is the obvious limitation for this, and homogeneity of pores as a function of material production is a requirement.

As previously described, it is known that it is important for the microstructure of a tissue scaffold to permit the diffusion of nutrients, waste products, and cells within its structure. It has been established that this requires a highly porous scaffold structure comprising open pores. For this reason, porous materials possess superior healing responses compared to smoother and/or less porous surfaces. The main limitation for the fabrication of this type of scaffold is mechanical stability. It has been suggested that the ideal mechanical property range for hard tissue, e.g. bone, tooth enamel and so on, is between 10 to 1500 MPa, and for soft tissue, e.g. tendons, ligaments, skin and so on, is between 0.4 to 350 MPa (Zhang et. al., Int J Oral Sci. 2014 June; 6(2):61-9; J Palacio-Torralba et al, J Mech Behavior of Biomedical Materials, 2015, 41, 149-160). However, most traditionally produced scaffolds have properties below these necessary thresholds. Pore sizes ranging from 200 to 1200 μm are not statistically significant in regard to bone growth, but the control of the pore sizes (homogenous morphology) does appear to be significant.

Some of the limitations related to processing are overcome through photopolymerization processes, such as stereolithography and continuous layer interface production methods. A number of polymers have been found to be compatible with stereolithography, for example, acrylates. While the use of acrylates has been found to be compatible with stereolithography, the material performance was poor both mechanically and for shape memory. Additionally, acrylate-based materials did not possess osteoconductivity without the presence of additives, indicating that while the porous materials were suitable as scaffolds, osteoblasts would not mature on the material surface without polydopamine. In one study (J D Erndt-Marino, ACS Biomater. Sci. Eng., 2015, 1 (12), pp 1220-1230), acrylate-based materials was poor both mechanically and for shape memory, and did not possess osteoconductivity, i.e. wherein the bone graft material serves as a scaffold for new bone growth that is perpetuated by the native bone, without the presence of additives. Therefore, osteoblasts, would not mature on the scaffold material without polydopamine. Additionally, acrylate has potentially toxic byproducts. Epoxidized acrylates have been demonstrated to possess superior biocompatibility compared with ethylene glycol based acrylates, although the presented works are severely limited in the printing of clinically relevant structures, and more importantly, the presented work was limited in thermomechanical tuning, presumably as well in regards functionality and degradation.

Another prior art example (R J Morrison, Science Translational Medicine, 2015, (7), 285) is the use of modified polycaprolactone for the 4D printing of paediatric tracheal stents, with successful implantation and survival in three neonatal human patients. However, the properties of this polymer were limited, specifically, in terms of degradation and the utility of the compositions.

As will be appreciated, there are few commercially available examples of medical devices comprising 4D materials, despite their obvious benefit to medical applications. This is because the 4D materials manufactured to date possess a number of significant limitations, including: (i) poor, or lack of, degradability; (ii) variable properties leading to variable performance, including, for example (iii) inconsistent or heterogeneous morphology; and (iv) manufacturing limitations such as limited processability, leading to, for example (v) the use of additives.

Therefore, there is yet to be a polymer system proposed that aims to address all of the aforementioned limitations. Importantly, the SMP compositions of the prior art do not comprise degradable properties. Additionally, the ability to tune the morphological and mechanical properties of SMPs has not been fully achieved using prior art compositions and methods. Finally, the compositions of the prior art have been limited in terms of processability.

It is therefore a non-exclusive object of the invention to provide a resin composition for the fabrication of biocompatible cross-linked polymers that is processable, particularly for use in fabrication techniques such as additive manufacture.

It is another non-exclusive object of the invention to provide a resin composition for the fabrication of biocompatible cross-linked polymers that is degradable into non-toxic by-products within physiological environments, and/or a material in which the rate of degradation is tunable.

It is another non-exclusive object of the invention to provide a resin composition for the fabrication of biocompatible cross-linked polymers, wherein the morphological and mechanical properties of the cross-linked polymer are tunable.

It is another non-exclusive object of the invention to provide a resin composition for the fabrication of biocompatible cross-linked polymers, wherein the cross-linked polymers may be fabricated into devices for biomedical applications.

It is another non-exclusive object of the invention to provide a resin composition for the fabrication of cross-linked polymers that exhibit shape memory properties.

A first aspect of the invention provides a resin composition, the resin composition comprising a prepolymer and optionally one or more diluent(s), the prepolymer comprising repeating units having at least one carbonate linkage and at least one unsaturated side-chain, the at least one optional diluent(s) comprising at least one unsaturated side-chain, wherein either or both of the prepolymer and the at least one optional diluent(s) comprises at least one O=C—N linkage, preferably a urethane linkage.

The O=C—N linkage may be one of a urethane linkage, and/or a urea linkage.

In embodiments, the resin composition may further comprise more than one diluent, for example two diluents, three diluents, four diluents, or more than four diluents. Each of the said at least one diluent may comprise at least one unsaturated side-chains, preferably plural unsaturated side chains.

In embodiments, the resin composition may comprise a prepolymer containing carbonate and urethane linkages and unsaturated side chains which are capable of being cross-linked; at least one cross linker capable of reacting with at least two unsaturated side chains of the prepolymer and, optionally, a cross linkable diluent or diluents comprising at least 2 unsaturated side chains.

In embodiments, the resin composition may comprise a prepolymer having repeating units, the repeating units comprising at least one carbonate linkage, at least one urethane linkage, and at least one unsaturated side-chain. In embodiments, the resin composition may further comprise a cross-linker.

In embodiments, one or more of the at least one diluent may comprise one or more of a urethane linkage and/or a urea linkage. We prefer the diluent to comprise the at least one urethane linkage and/or urea linkage.

In embodiments, the unsaturated side-chain of the prepolymer and/or the diluent may comprise an aliphatic moiety (e.g. an alkene, an alkyne), or an aromatic moiety, for example, a phenyl group or a substituted phenyl group, a heterocyclic aromatic moiety, or a polycyclic aromatic hydrocarbon. The unsaturated side-chain may be linear or may be cyclic.

Alternatively, the or one or more of each of the one or more diluents may comprise plural moieties, for example a side chain comprising one or more different moieties, i.e. a moiety other than an unsaturated side-chain.

Wherein the, one, some or each of the one or more diluents comprises an unsaturated side-chain, the cross-linker may comprise a moiety that is capable of reacting with the at least one unsaturated side-chain of the prepolymer and/or optionally an at least one unsaturated side-chain of a or the diluent. For example, the cross-linker may comprise an azide moiety that is capable of reacting with an alkyne moiety on the one or more diluents. Alternatively, the cross-linker may comprise a thiol group that is capable of reacting with an alkene moiety on the one or more diluents.

Alternatively, wherein each of the one or more diluents comprise a side chain comprising a different moiety, i.e. a moiety other than an unsaturated side-chain, the moiety may be capable of reacting with the moiety on the cross-linker to produce a covalent bond between the cross-linker and one or more of the diluents. For example, the cross-linker may comprise an unsaturated side-chain, for example, an alkyne, and one or more of the diluents may comprise an azide group. Alternatively, the cross-linker may comprise an alkene and the one or more diluents may comprise a thiol moiety.

The diluent may comprise one or more allyl groups, for example, the diluent may comprise two allyl groups, or three allyl groups, or four allyl groups. The diluent may comprise the general formula (i):

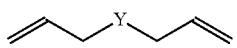

(i)

wherein Y comprises an alkyl and/or an aryl moiety, or a functionalised alkyl and/or a functionalised aryl moiety. For example, Y may comprise an alkyl chain comprising 1 to 15 carbons, for example 1 to 10 carbons, or 1 to 5 carbons. For example, Y may comprise an alkyl chain comprising 1, 2, 3, 4, 5, 6, 7, 8, 9, or 10 carbons.

In embodiments, the one or more diluents may be selected from the following formulae (ii) to (v):

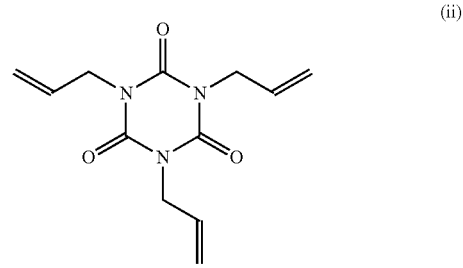

(ii)

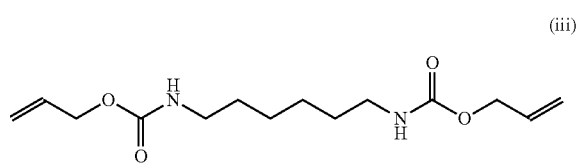

(iii)

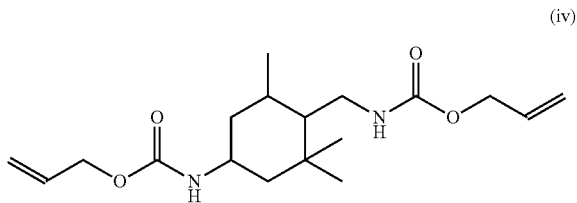

(iv)

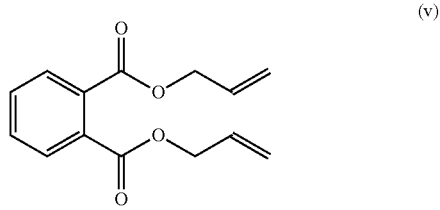

(v)

In embodiments, the diluent may be propylene carbonate.

In embodiments, the cross-linker comprises one or more thiol moieties, for example, one thiol moiety, two thiol moieties, three thiol moieties, or four moieties, or more than four moieties. In embodiments, the cross-linker has a molecular weight of between 100 to 800 g/mol, for example, between 200 to 700 g/mol, or 300 to 600 g/mol, or 400 to 500 g/mol.

The cross-linker may be pentaerythritol tetrakis(3-mercaptopropionate), comprising the formula (vi):

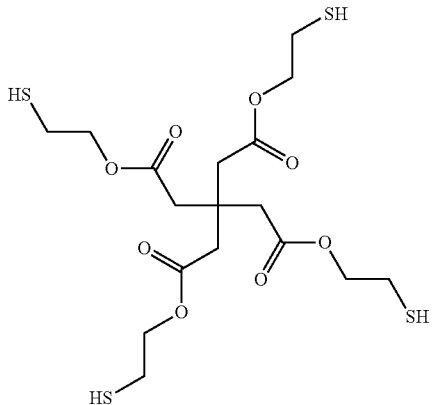

(vi)

In embodiments, the prepolymer may comprise the formula (vii):

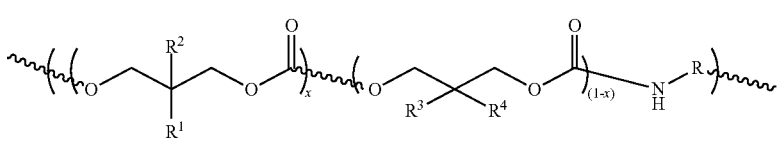

(vii)

wherein R group is an aliphatic or an aromatic moiety or group, $R^1$ is an aliphatic or an aromatic moiety or group, $R^2$ is an aliphatic or an aromatic moiety or group, $R^3$ is an aliphatic or an aromatic moiety or group, and $R^4$ is an aliphatic or an aromatic moiety or group, and wherein x is a number that is less than one hundred, e.g. 99, 98, 97, 96, 95, 94, 93, 92, 91, 90, 80, 70, 60, 50, 40, 30, 20, or 10.

In embodiments, the prepolymer may comprise the formula (viii):

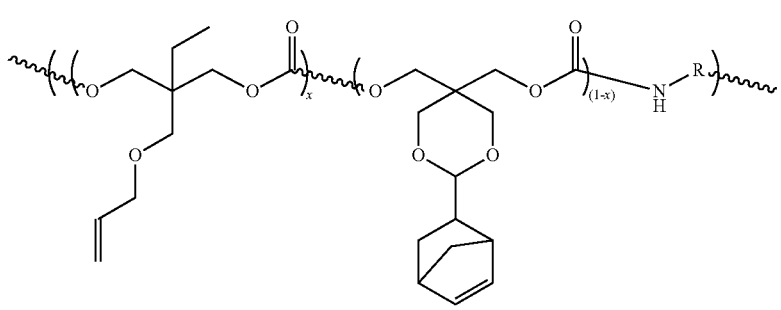

(viii)

wherein the R group is an aliphatic or an aromatic moiety or group, and wherein x is a number that is less than one hundred, e.g. 99, 98, 97, 96, 95, 94, 93, 92, 91, 90, 80, 70, 60, 50, 40, 30, 20, or 10.

In an embodiment, R is an alkyl group comprising six carbons.

In embodiments, the prepolymer may be fabricated from components comprising the formulae (ix) and a diisocyanate (I):

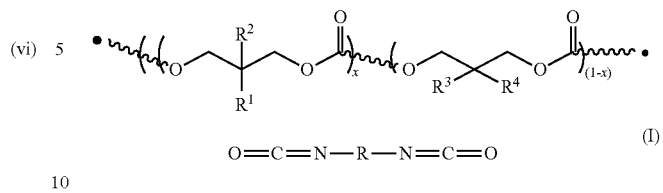

(ix)

$$O=C=N-R-N=C=O$$ (I)

wherein R group is an aliphatic or an aromatic moiety or group, $R^1$ is an aliphatic or an aromatic moiety or group, $R^2$ is an aliphatic or an aromatic moiety or group, $R^3$ is an aliphatic or an aromatic moiety or group, and $R^4$ is an aliphatic or an aromatic moiety or group, and wherein x is a number that is less than one hundred, e.g. 99, 98, 97, 96, 95, 94, 93, 92, 91, 90, 80, 70, 60, 50, 40, 30, 20, or 10.

In embodiments, any or all of $R^1$, $R^2$, $R^3$ and/or $R^4$ may be a hydrogen atom, an alkyl chain, e.g. methyl, ethyl, propyl, butyl and so on, and isomers thereof; an aromatic ring, an aliphatic ring, an allyl ether, an acrylate (e.g. with modification), and/or an allyl ester.

In embodiments wherein R, $R^1$, $R^2$, $R^3$, and/or $R^4$ is an aromatic group, the aromatic group may be one of, or a combination of, an aromatic hydrocarbon group, and/or an aromatic heterocyclic group.

In embodiments wherein R, $R^1$, $R^2$, $R^3$, and/or $R^4$ is or comprises an aromatic hydrocarbon group, the aromatic hydrocarbon group may comprise one of, or a combination of, a phenyl ring and/or a substituted phenyl ring. There may be one, two, three, four, or five additional substituents on the phenyl ring. The substituents are bonded directly to the phenyl ring, and may be one of, or a combination of, fluorine, chlorine, bromine, iodine, a hydroxyl group, an amine group, a nitro group, an alkoxy group, a carboxylic acid, an amide, a cyano group, a trifluoromethyl, an ester, an alkene an alkyne, an azide, an azo, an isocyanate, a ketone, an aldehyde, an alkyl group consisting of a hydrocarbon chain, or a hydrocarbon ring, an alkyl group consisting of other heteroatoms such as fluorine, chlorine, bromine, iodine, oxygen, nitrogen, and/or sulphur. The alkyl group may comprise a hydroxyl group, an amine group, a nitro group, an ether group, a carboxylic acid, an amide, a cyano group, trifluoromethyl, an ester, an alkene an alkyne, an azide, an azo, an isocyanate, a ketone, an aldehyde, for example. The substituents may be another aromatic group, for example, R, $R^1$, $R^2$, $R^3$, and/or $R^4$ may comprise a phenyl substituted with a further phenyl ring. In embodiments, the R, $R^1$, $R^2$, $R^3$, and/or $R^4$ group may be a phenyl ring, substituted with a second phenyl ring, which in turn is substituted with a third phenyl ring.

In embodiments wherein R, $R^1$, $R^2$, $R^3$, and/or $R^4$ is an aromatic group, the aromatic group may be a polycyclic aromatic hydrocarbon, for example, naphthalene, anthracene, phenanthrene, tetracene, chrysene, triphenylene, pyrene, pentacene, benzo[a]pyrene, corannulene, benzo[ghi]perylene, coronene, ovalene, fullerene, and/or benzo[c]fluorene. The R group may be bonded to the triphenylene derivative by any isomer of the polycyclic aromatic hydrocarbons described, for example, 1-napthalene, 2-napthalene, 2-anthracene, 9-anthracene. The polycyclic aromatic hydrocarbon group may be substituted with other moieties such as aryl groups, alkyl groups, heteroatoms, and/or other electron withdrawing or electron donating groups.

In embodiments wherein R, $R^1$, $R^2$, $R^3$, and/or $R^4$ is an aromatic heterocyclic group, the heterocyclic group may be a four membered ring, a five membered ring, a six membered ring, a seven membered ring, an eight membered ring, a nine membered ring, a ten membered ring, or a fused ring. In embodiments, the heterocyclic group may be furan, benzofuran, isobenzofuran, pyrrole, indole, isoindole, thiophene, benzothiophene, benzo[c]thiophene, imidazole, benzimidazole, purine, pyrazole, indazole, oxazole, benzoxazole, isoxazole, benzisoxazole, thiazole, benzothiazole, pyridine, quinoline, isoquinoline, pyrazine, quinoxaline, acridine, pyrimidine, quinozoline, pyridazine, cinnoline, phthalazine, 1,2,3-triazine, 1,2,4-triazine, 1,3,5-triazine.pyridine or thiophene.

In embodiments wherein R, $R^1$, $R^2$, $R^3$, and/or $R^4$ is an aliphatic group, the aliphatic group may be one of, or a combination of, an n-alkyl chain, a branched alkyl chain, an alkyl chain comprising unsaturated moieties, an alkyl chain comprising heteroatoms, for example, fluorine, chlorine, bromine, iodine, oxygen, sulphur, nitrogen. The alkyl chain may comprise unsaturated portions, comprising alkenes, or aromatic moieties. The alkyl chain may comprise functional groups for further derivatisation of the triphenylene derivative. For example, the functional groups may be one or more of an azide, a carbonyl group, an alcohol, a halogen, or an alkene.

R, $R^1$, $R^2$, $R^3$, and/or $R^4$ may comprise an aliphatic ring, or an aromatic ring. R, $R^1$, $R^2$, $R^3$, and/or $R^4$ may comprise an allyl ether, an acrylate, a modified acrylate, and/or an allyl ester. R, $R^1$, $R^2$, $R^3$, and/or $R^4$ may comprise a spirocyclic aliphatic ring, and/or a bridged ring, e.g. a norbornene ring.

We prefer R to be an aliphatic moiety.

In embodiments, the prepolymer has a molecular weight of up to 3 kDa, for example up to 1 kDa, or 2 kDa. The prepolymer may comprise a polydispersity index (PDI) of approximately 1.4.

In embodiments, the prepolymer may be a polycarbonate. In embodiments, the prepolymer may not comprise a urethane linkage and/or any other O=C—N linkage. The prepolymer may be a homopolymer of 5-[(allyloxy)methyl]-5-ethyl-1,3-dioxan-2-one. Additionally or alternatively, the prepolymer may be a homopolymer of 9-(5-norbornen-2-yl)-2,4,8,10-tetraoxa-3-spiro[5.5]undecanone. The prepolymer may comprise a copolymer of 5-[(allyloxy)methyl]-5-ethyl-1,3-dioxan-2-one and 9-(5-norbornen-2-yl)-2,4,8,10-tetraoxa-3-spiro[5.5]undecanone.

In embodiments, the prepolymer may be chain extended using an isocyanate compound to create a urethane linkage. The isocyanate compound preferably comprises two or more isocyanate moieties. For example, the isocyanate may be isophorone diisocyanate (IPDI). In alternative embodiments, the isocyanate is hexamethylene diisocyanate (HDI). However, any suitable diisocyanate may be used, e.g. tetramethylxylene diisocyanate (TMXDI), phenylene diisocyanate, toluene diisocyante (TDI), xylylene diisocyanate (XDI), cyclohexylene diisocyanate and so on.

The resin composition may comprise the prepolymer being present in a quantity of between 10 and 100 w/w % of the total composition, for example, between 20 and 90 w/w %, or 40 and 80 w/w %, or 60 and 70 w/w %. For example, the resin composition may comprise the prepolymer in a quantity of 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, or 75 w/w %. In embodiments, the resin composition comprises the prepolymer is present in the resin composition in a quantity of 60 w/w %.

In embodiments, the total quantity of diluent may be present in a quantity of between 0 and 50 w/w % of the total composition, for example, between 5 and 45 w/w %, or 10 and 40 w/w %, or 15 and 35 w/w %, or 20 and 30 w/w % or 25 w/w %. For example, the resin composition may comprise a total quantity of diluent of 20, 21, 22, 23, 24, 25, 26, 27, 28, 29, 30, 31, 32, 33, 34, 35, 36, 37, 38, 39, or 40 w/w %.

The cross-linker may be present in a quantity of between 0 and 50 w/w % of the total composition, for example, between 5 and 45 w/w %, or 10 and 40 w/w %, or 15 and 35 w/w %, or 20 and 30 w/w % or 25 w/w %. For example, the resin composition may comprise a total quantity of cross-linker of 20, 21, 22, 23, 24, 25, 26, 27, 28, 29, 30, 31, 32, 33, 34, 35, 36, 37, 38, 39, or 40 w/w %

A further aspect of the invention provides a method of fabricating a prepolymer for use in a resin composition, the prepolymer comprising the formula (C), the method comprising:
  i. providing an oligomer of formula (A);
  ii. providing a reagent of the formula (B), wherein the reagent (B) comprises two or more isocyanate moieties;
  iii. reacting the oligomer (A) with the reagent (B) to fabricate the prepolymer (C),

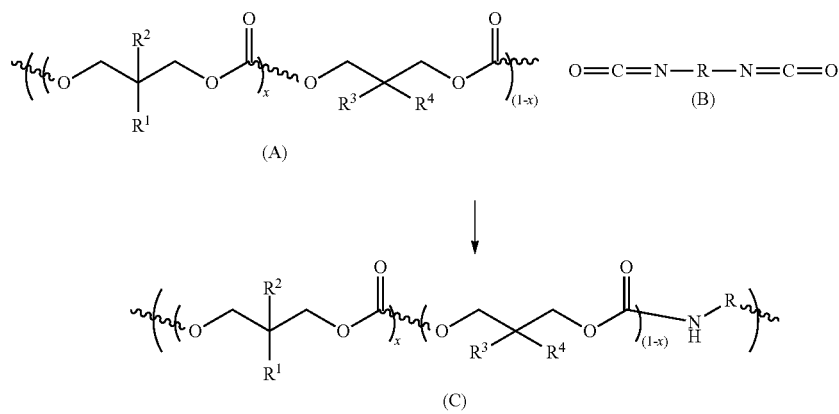

wherein R group is an aliphatic or an aromatic moiety or group, $R^1$ is an aliphatic or an aromatic moiety or group, $R^2$ is an aliphatic or an aromatic moiety or group, $R^3$ is an aliphatic or an aromatic moiety or group, and $R^4$ is an aliphatic or an aromatic moiety or group, and wherein x is a number that is less than one hundred, e.g. 99, 98, 97, 96, 95, 94, 93, 92, 91, 90, 80, 70, 60, 50, 40, 30, 20, or 10.

We prefer R to be aliphatic although aromatic groups may be used.

A yet further aspect of the invention provides a resin composition that is used to fabricate a cross-linked polymer, for example a shape memory polymer, i.e. the cross-linked polymer may comprise a permanent state and a temporary state, the permanent state being capable of undergoing a morphological change to the temporary state, or vice versa, upon induction by an external stimulus. The external stimulus may be a temperature change, for example, a temperature change approximately at a physiological temperature. The external stimulus may comprise one or more of direct or Joule heating, radiation and laser heating, microwaves, pressure, moisture, the presence or absence of solvent or solvent vapours, and/or change in pH. The resin composition may be as set out above.

The cross-linked polymer of the invention may exhibit a dry moduli value of between 1 MPa and 2 GPa. The cross-linked polymer may exhibit a modulus value in PBS between 1 MPa and 0.8 GPa.

The cross-linked polymer of the invention may be degradable, i.e. the polymer may degrade into degradation products that are metabolised or excreted under physiological conditions without causing harm. The cross-linked polymer may exhibit degradation via surface erosion. The cross-linked polymer may degrade upon exposure to, for example, water, heat, a change in pH (e.g. from exposure to acid or base), or another chemical change or physical force. The cross-linked polymer may degrade into non-toxic byproducts, for example, non-toxic small molecule byproducts, for example, oligomers and/or monomers e.g. carbonate monomers, carbonate urethanes, diols, carbamates, and/or urethanes.

Advantageously, controlling the amount or number of carbonate linkages in the composition enables the degradability of the resulting cross-linked polymer to be controlled. Also, controlling the amount or number of urethane and/or urea linkages in the composition enables the shape memory behaviour of the cross-linked polymer to be controlled.

The cross-linked polymer of the invention may exhibit the following mechanical properties: a dry modulus value of less than 1 MPa to greater than 1 GPa (1000 MPa), for example, between 100 MPa to 1 GPa, or 200 MPa to 1 GPa, or 300 MPa to 1 GPa, or 400 MPa to 1 GPa, or 500 MPa to 1 GPa, 600 MPa to 1 GPa, or 700 MPa to 1 GPa, 800 MPa to 1 GPa, or 900 MPa to 1 GPa. The dry modulus value depends on the composition and the geometry of the cross-linked polymer; a strain-to-failure value of greater than 100%.

The cross-linked polymer of the invention may exhibit a glass transition temperature (Tg) of between −10° C. and 150° C., for example, between 0 to 130° C., or 5 to 120° C. or 10 to 100° C., or 20 to 80° C., or 30 to 60° C., or 35 to 45° C. For example, the glass transition temperature (Tg) of the cross-linked polymer may be 25, 26, 27, 28, 29, 30, 31, 32, 33, 34, 35, 36, 37, 38, 39, 40, 41, 42, 43, 44, or 45° C. For example, the glass transition temperature (Tg) of the cross-linked polymer may be between 36.5 and 37.5° C.

A yet further aspect of the invention provides a device that is fabricated from the cross-linked polymer. The device may be fabricated using an additive manufacturing technique or apparatus. For example, the device may be fabricated using stereolithography, or microstereolithography.

The device may be a 4D printed device, i.e. the device is fabricated using an additive manufacturing technique such as 3D printing to produce a primary shape, and the device is further deformed and/or manipulated to produce a secondary shape. The secondary shape may a flexible and/or deployable shape, for example, a minimally invasive shape for minimally invasive delivery to a site within a patient. The device may be manufactured using machining techniques, for example, turning, milling, and/or drilling techniques. The device may comprise or be a complex product that may be assembled by hand, through assembling simpler parts into a complex product, and/or fixation and/or adhering.

The device may be for a biomedical application, and/or may be a medical device, and/or an implantable medical device. For example, the device may be used in cardiovascular, orthopaedic, surgical, or rehabilitative applications. The device may be a vascular device, and/or a device for cardiac defects. The device may be an absorbable plate, a screw, an interbody spacer and/or another resorbable device. The device may be a stent, e.g. a stent for coronary, peripheral, nasal and auditory applications and so on. The stent may possess shape memory properties, i.e. conforming to local tissue. The device may be used for systemic and/or local drug delivery, e.g. transdermal drug delivery, e.g. in postoperative pain management, or in anti-infective absorbable implants. The device may be used in tissue engineering, in microneedles and/or in vaccine deliveries. The device may be an eluting device, e.g. an implant and/or a drug delivery device.

The device may be a tissue scaffold, for example, a porous tissue scaffold. The device may be porous. In embodiments, the pore sizes may range from approximately 200 µm to 1500 µm.

Alternatively, the device may be used in self fitting electronics, for example, 3D printed electronic sensors, and/or biosensors.

A yet further aspect of the invention provides a method of fabricating a cross-linked polymer, the cross-linked polymer comprising at least one unsaturated side-chain, the method comprising:
  i. providing a resin composition, the resin composition comprising a prepolymer and optionally one or more diluent(s), the prepolymer comprising repeating units having at least one carbonate linkage and at least one unsaturated side-chain, the at least one optional diluent(s) comprising at least one unsaturated side-chain, wherein either or both of the prepolymer and the at least one optional diluent(s) comprises at least one O=C—N linkage, preferably a urethane linkage;
  ii. cross-linking the prepolymer.

Preferably, step (ii) cross-linking the pre-polymer is performed by contacting the resin composition with an initiator. Preferably, an energy source is provided to activate the initiator.

The method may comprise contacting the resin composition with a catalyst and/or an initiator. For example, the catalyst and/or initiator may be a photoinitiator. The method may comprise exposing the resin composition comprising a photoinitiator to an energy source, for example, a light source, for example, UV light.

The initiator may be a photoinitiator, e.g. a bis acyl phosphine. Suitable photoinitiators include those sold under the trade name Irgacure® by BASF, for example, Irgacure 819, or those sold under the trade name Omnicat® photoinitiators by IGM resins.

The initiator may be a radical initiator, for example, a peroxide such as hydrogen peroxide, or an organic peroxide such as benzoyl peroxide. The radical initiator may be an azo compound, for example, AIBN or ABCN. In embodiments, the energy source may be heat, i.e. the reaction may be initiated thermally.

The initiator may be present in a quantity of between 0 and 5 w/w % of the total composition, for example, up to 4 w/w %, or up to 3 w/w %, or up to 2 w/w %, or up to 1 w/w % of the total composition, for example, 0.5 w/w % of the total composition. The initiator, e.g. the photoinitiator, may be present in a quantity of 0.5, 1.0, 1.5, 2.0, 2.5, 3.0, 3.5, 4.0, 4.5, or 5.0 w/w % of the total composition.

The method may be performed in or by an apparatus for 3D printing, e.g. an apparatus for stereolithography.

The cross-linked polymer may be further functionalised. The further functionalisation may take place post polymerisation, i.e. after the cross-linked polymer has been fabricated from the resin composition. The cross-linked polymer may comprise unsaturated side-chains after the cross-linking process has taken place. The method may comprise further functionalisation of these unsaturated side chains. For example, the method may comprise cross-linking a polymer in an additive manufacturing process, e.g. a 3D printing process and/or a stereolithography process, and further providing reagents to functionalise the cross-linked polymer, e.g. the surface of the cross-linked polymer. The functionalisation of the cross-linked polymer may take place in a separate step.

In embodiments, the method may further comprise step iii. providing a reagent for halogenation of at least one unsaturated side chain of the cross-linked polymer. The reagent may be a diatomic halogen, e.g. chlorine, bromine and/or iodine, or a halogenating reagent, e.g. a hypohalous acid such as HOCl, HOBr, HOI, or a Brønsted acid, e.g. HF, HCl, HBr, and/or HI.

Additionally or alternatively, the method may further comprise step iv. providing a reagent for alkylation of the at least one unsaturated side chain. The reagent may be an alkylating agent, e.g. an alkyl halide, or an alkyl thiol.

Additionally or alternatively, the method may further comprise step v. providing a reagent for functionalising the at least one unsaturated side chain with a hydrophobic moiety. The hydrophobic moiety may increase the hydrophobicity of the cross-linked polymer. The hydrophobic moiety may comprise an alkyl chain, for example, a linear alkyl chain comprising between 8 and 15 carbons, say 10 carbons, or 9, 10, 11, 12, 13, 14, or 15 carbons. In embodiments, the reagent may be a compound comprising a thiol moiety, e.g. an alkyl or aryl thiol compound, that is capable of adding across an unsaturated side-chain, e.g. an alkene moiety.

Additionally or alternatively, the method may further comprise a step for providing a reagent for functionalising the at least one unsaturated side chain with a hydrophilic moiety. The hydrophilic moiety may increase the hydrophilicity of the cross-linked polymer. The hydrophilic moiety may comprise one or more carboxylic acid groups, and/or one or more hydroxyl groups. The hydrophilic moiety may comprise an alkyl chain comprising one or more carboxylic acid groups and/or one or more hydroxyl groups. In embodiments, the reagent may be a compound comprising a thiol moiety comprising hydrophilic groups, e.g. an alkyl or aryl thiol compound comprising hydrophilic side groups, that is capable of adding across, and/or reacting with, an unsaturated side-chain, e.g. an alkene moiety to form a covalent bond.

Alternatively, the unsaturated side-chains of the cross-linked polymer may be further functionalised in other types of reaction. For example, the one or more unsaturated side-chain of the cross-linked polymer may be an alkene, and may react in a cycloaddition, e.g. a Diels-Alder reaction. Other atoms or moieties may be added across or to the unsaturated side chains. For example, the unsaturated side-chain may be an alkene that undergoes an epoxidation or a cyclopropanation.

Additionally or alternatively, the method may further comprise a step for providing a reagent for functionalising the at least one unsaturated side chain with a tag, for example, a fluorescent tag, a radioactive tag, or a biomolecule tag, for labelling or detection of the cross-linked polymer. This is particularly useful if the cross-linked polymer is fabricated into a medical device for implantation into a patient.

Additionally or alternatively, the method may further comprise step vi. providing a reagent for functionalising the at least one unsaturated side chain with a biomolecule, for example, a protein, and/or a cell adhesion moiety, e.g. a cell adhesion molecule (CAM). The biomolecule may be involved in adhesion or binding to physiological targets. For example, a cell adhesion molecule (CAM) may be involved in binding to cells, e.g. bone cells within a tissue scaffold, or to the extracellular matrix. For example, the further functionalised cross-linked polymer may comprise a functionalised surface to elicit a specific cellular response.

The steps iii, iv, v, and/or vi of the method may be performed at the same time as the resin composition is fabricated into a cross-linked polymer, e.g. during additive manufacture, or may be performed after the resin composition has been fabricated into a cross-linked polymer in a separate step, i.e. after steps i to ii of the method. Only one of the steps iii, iv, v, and/or vi may be performed after steps i to ii have been performed. Alternatively, two or more of the steps may be selected to be performed, either consecutively or concurrently, after steps i to iii have been performed. For example, the method may comprise steps i to ii, followed by step iii and further followed by step vi.

Additionally or alternatively, the monomers of the prepolymer may undergo further functionalisation. The monomers of the prepolymer may be functionalised before polymerisation into the prepolymer. The monomers of the prepolymer may be functionalised after polymerisation into the prepolymer, but before cross-linking into a cross-linked polymer.

For the avoidance of doubt, any of the features described herein apply equally to any aspect of the invention. For example, the resin composition may comprise none of, or any one or more of the cross-linker, and/or one or more diluents. Any appropriate cross-linker and/or diluent or diluent combination may be used in the resin composition, with any appropriate moiety or moiety combination capable of cross-linking the polymer.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Embodiments of the invention will now be described by way of example only with reference to the accompanying drawings in which.

Figure 1:
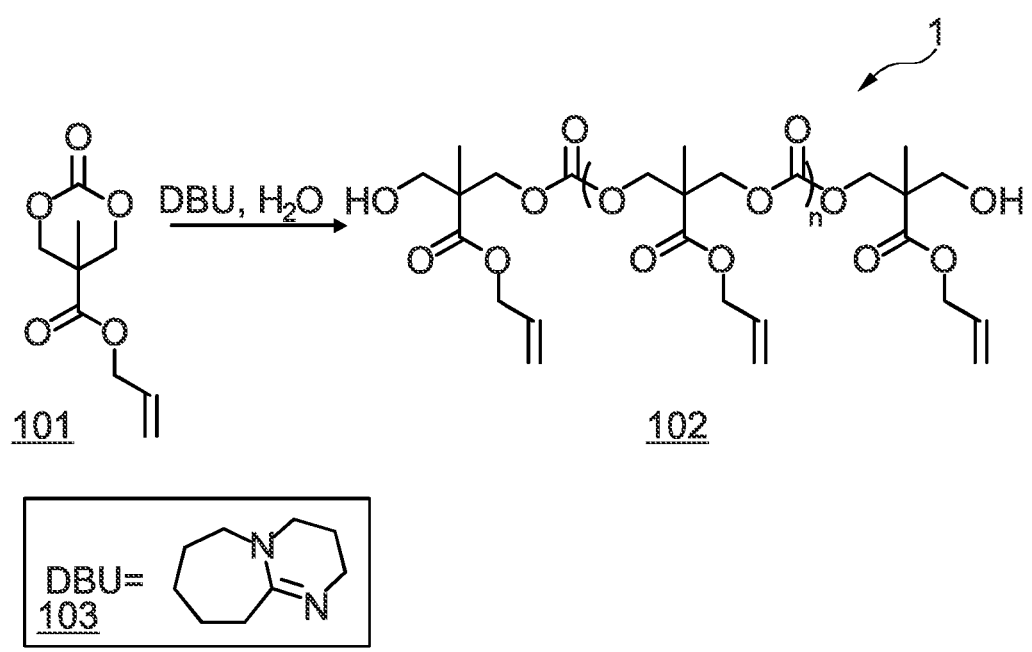
FIG. 1 is a synthetic route to a prepolymer of the prior art for use in a resin composition for the fabrication of a polycarbonate cross-linked polymer.

Referring first to FIG. 1, there is shown a synthetic route 1 to a prepolymer 102 of the prior art for use in a resin composition (I A Barker et. al., Biomaterials Science, 2014, 2, 472-475). The prepolymer 102 is an oligomer of a linear polycarbonate homopolymer comprising carbonate monomers 101. Polymerisation of the carbonate monomer 101 was achieved in an organocatalyzed reaction using a DBU (1,8-diazabicyclo[5.4.0]undec-7-ene) initiator 103 in water. The prepolymer 102 was formulated into a resin composition (not shown) further comprising a photoinitiator (not shown) and a thiol crosslinker (not shown). The prepolymer 102 of the resin composition underwent cross-linking to fabricate a polycarbonate cross-linked polymer (not shown) in a microstereolithographic process. The polycarbonate cross-linked polymer was degradable, and was suitable for use as a tissue scaffold. However, the polycarbonate cross-linked polymer did not exhibit shape memory properties.

Figure 2A:
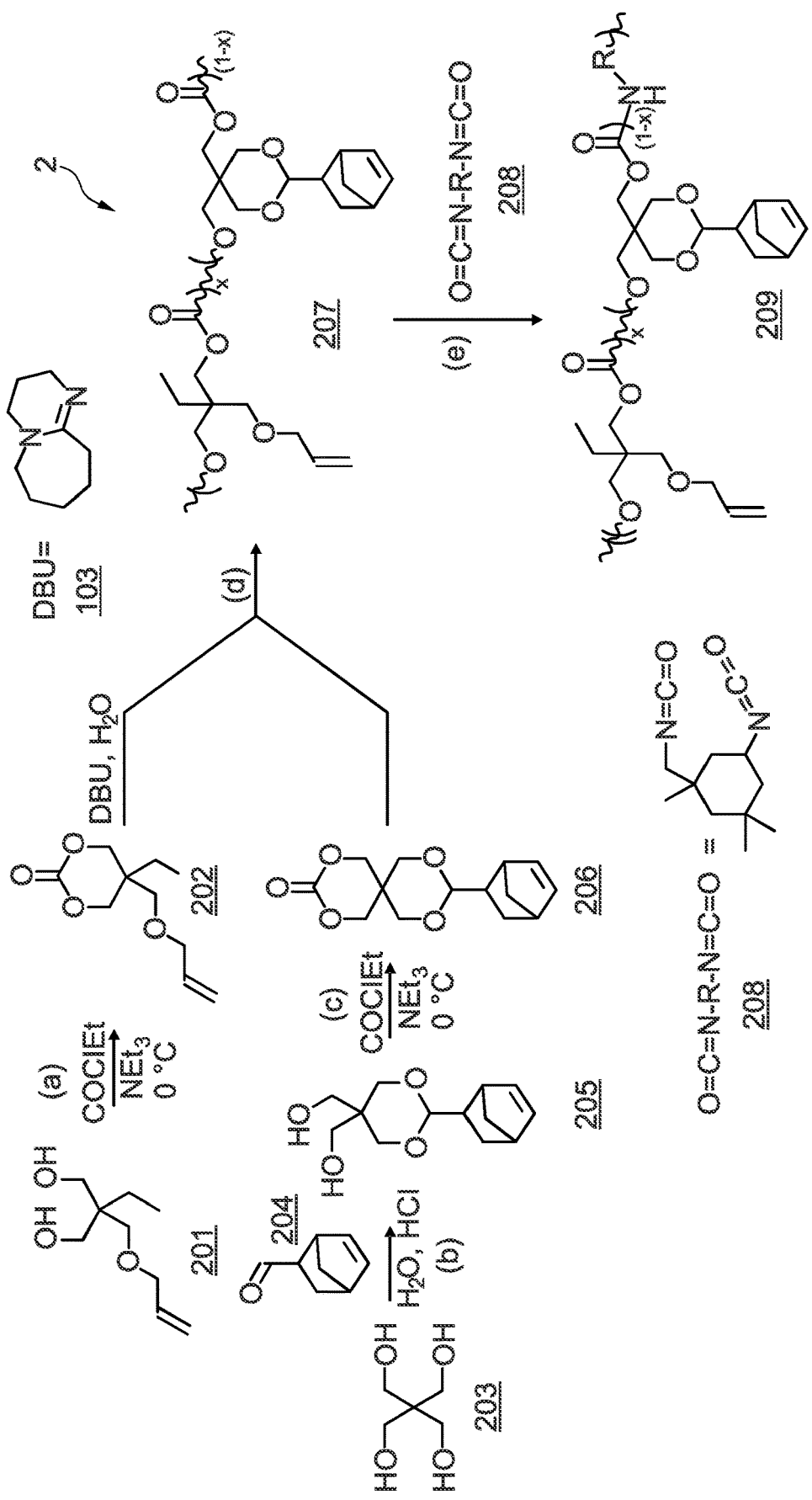
FIG. 2A is a synthetic route to a prepolymer for use in a resin composition for use in forming a cross-linked polymer, according to embodiments of the invention.

Referring now to FIG. 2A, there is shown a synthetic route 2 to a prepolymer 209 for use in a resin composition, according to an embodiment of the invention. In this embodiment, the prepolymer 209 was fabricated in chain extension reaction (e) from a polycarbonate oligomer 207 and a diisocyanate 208 to produce the prepolymer 209, which is a mixed polycarbonate polyurethane oligomer. In this embodiment, the diisocyanate 208 is isophorone diisocyanate (IPDI) 208. The prepolymer 209 had molecular weights of less than or equal to 3 kDa and polydispersity indices (PDI) of 1.4.

The polycarbonate 207 was synthesised in ring opening polymerisation reaction (d) from first cyclic carbonate 202 and second cyclic carbonate 206 in the presence of water and a DBU initiator 103. The reaction (d) of first cyclic carbonate 202 and second cyclic carbonate 206 yielded oligomers of polycarbonate 207 with lengths of below 1.2 kDa with PDIs of below 1.2.

In this embodiment, first cyclic carbonate 202 is 5-[(allyloxy)methyl]-5-ethyl-1,3-dioxan-2-one, and second cyclic carbonate 206 is 9-(5-norbornen-2-yl)-2,4,8,10-tetraoxa-3-spiro[5.5]undecanone, which were synthesised in accordance with the protocols described in IA Barker et. al., Biomaterials Science, 2014, 2, 472-475; and also in Y He et. al., Reactive and Functional Polymers, Vol. 71, Issue 2, February 2011, p. 175-186.

First cyclic carbonate 202 was synthesised in one step, in reaction (a) from diol 201 and propionyl chloride in the presence of triethylamine at 0° C. In this embodiment, diol 201 is 2-[(allyloxy)methyl]-2-ethyl-1,3-propanediol.

Second cyclic carbonate 206 was synthesised in two steps, using polyol 203 as the starting material. In reaction (b), polyol 203 and aldehyde 204 underwent reaction in the presence of hydrochloric acid to produce diol 205. Diol 205 underwent subsequent reaction, in reaction (c), with propionyl chloride in the presence of triethylamine at 0° C. to produce the second carbonate 206. In this embodiment, polyol 203 is pentaerythritol, aldehyde 204 is bicyclo[2.2.1]hept-5-ene-2-carboxaldehyde, and diol 205 is [5-(hydroxymethyl)-2-(5-norbornen-2-yl)-1,3-dioxan-5-yl]methanol.

Figure 2B:
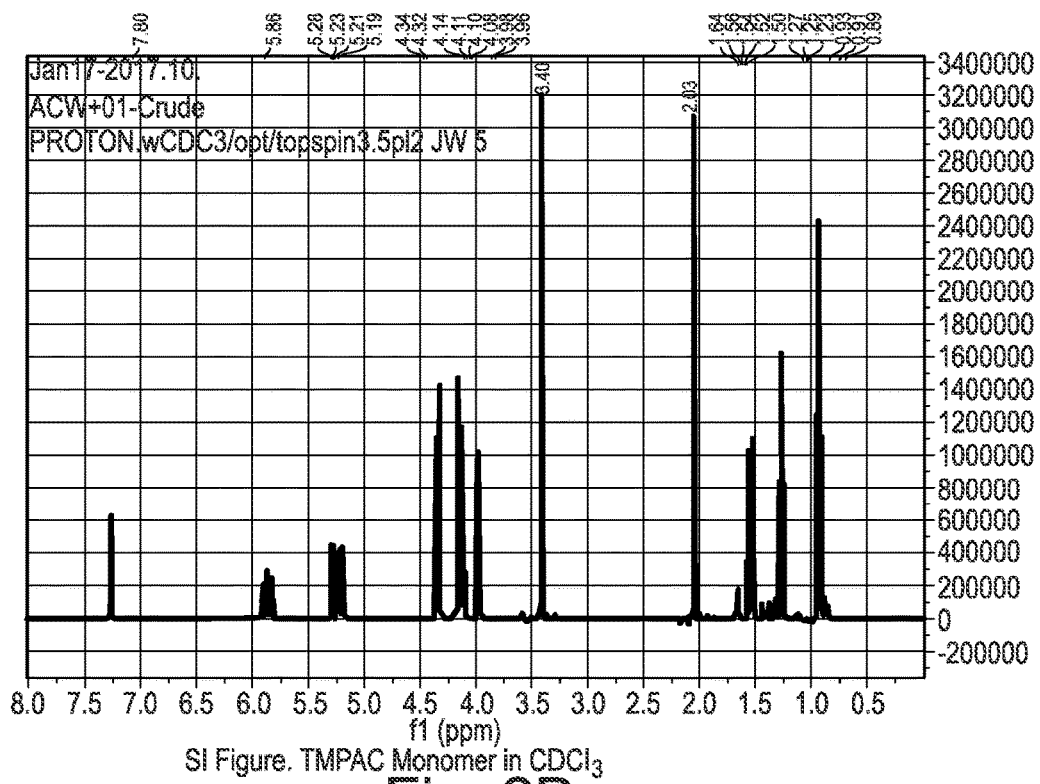
FIG. 2B is the $^1$H NMR spectrum of the first cyclic carbonate 202.
Figure 2C:
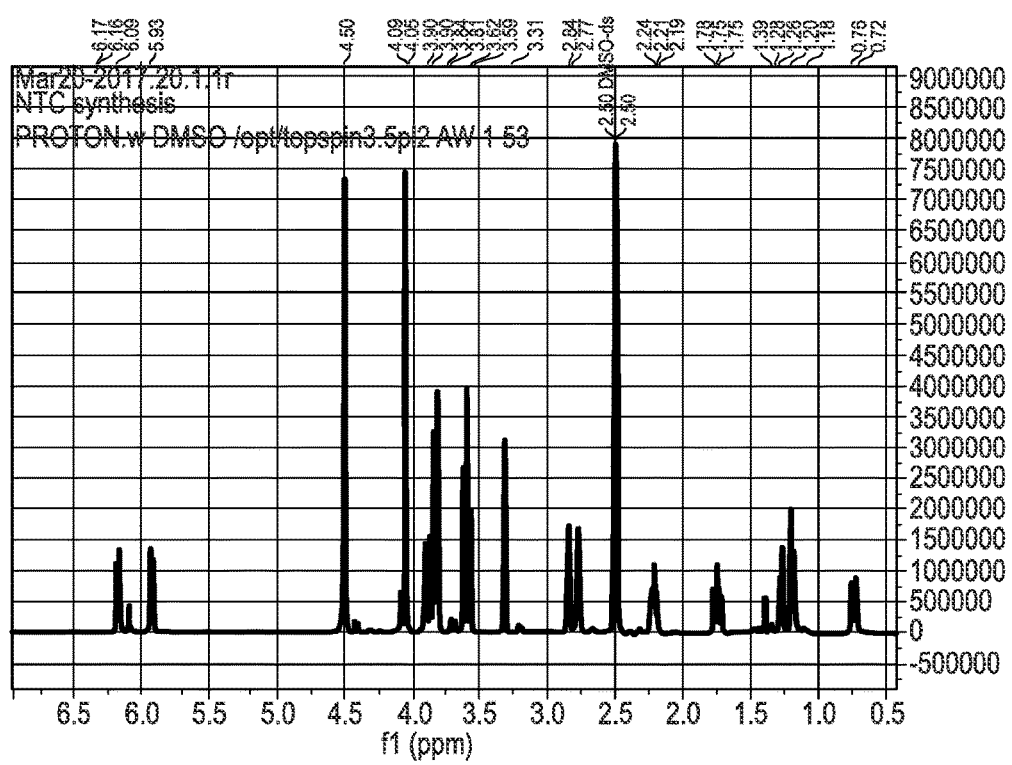
FIG. 2C is the $^1$H NMR spectrum of the second cyclic carbonate 206.

Referring also to FIG. 2B and FIG. 2C, there is shown the $^1$H NMR spectrum of the first cyclic carbonate 202 (FIG. 2B), and the $^1$H NMR spectrum of the second cyclic carbonate 206 (FIG. 2C).

Figure 2D:
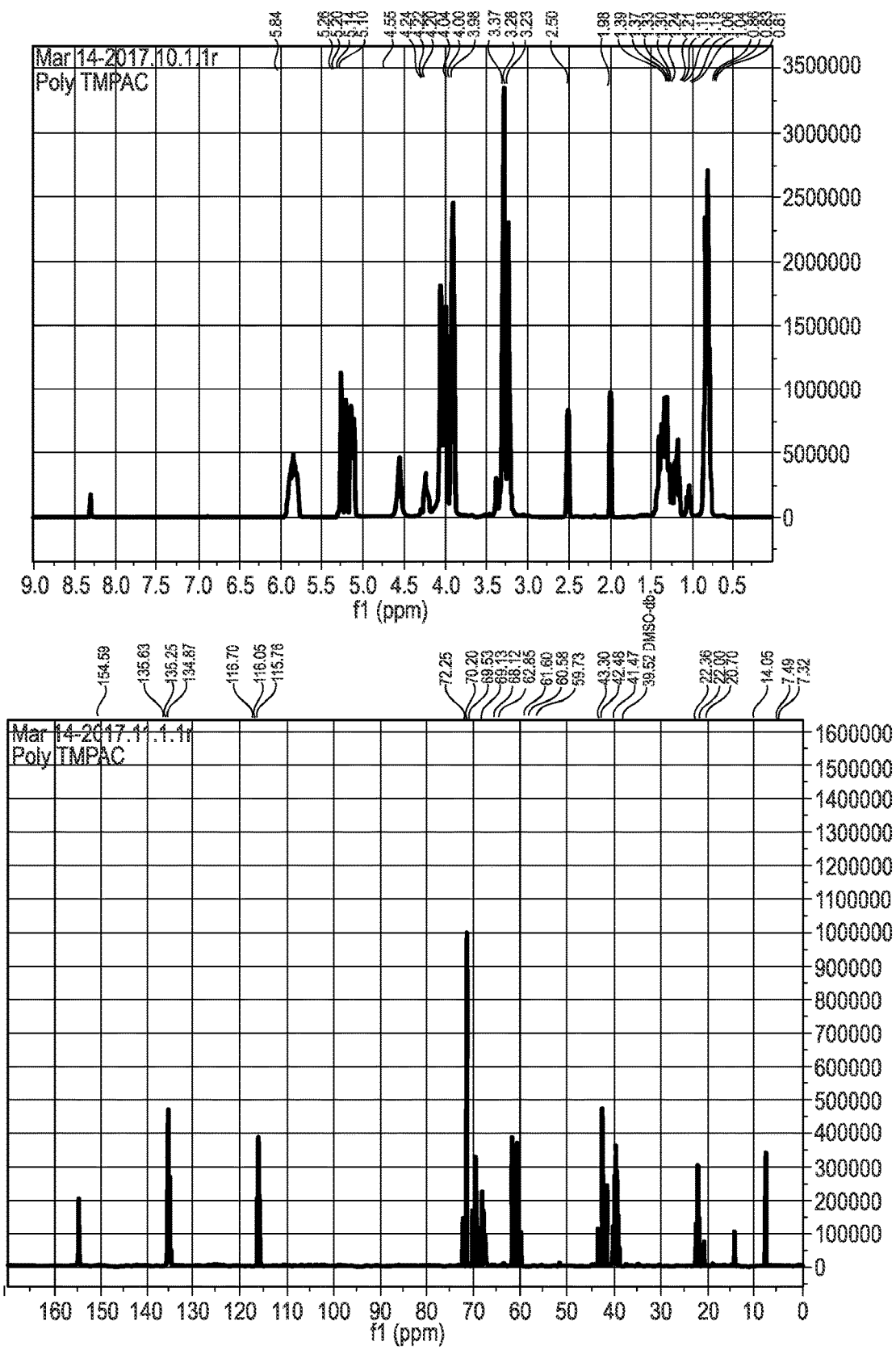
FIG. 2D is the $^1$H NMR spectrum the $^{13}$C NMR spectrum of the polycarbonate prepolymer 604, which was synthesised via polymerisation of the first cyclic carbonate monomer 202.

In alternative embodiments, a prepolymer (prepolymer 604, not shown) may be fabricated by polymerisation the first cyclic carbonate 202 only. The $^1$H NMR spectrum the $^{13}$C NMR spectrum for this prepolymer is shown in FIG. 2D.

In alternative embodiments, a prepolymer (not shown) may be fabricated by polymerisation of the second cyclic carbonate 206 only.

In embodiments, polycarbonate 207 may be used as a prepolymer in a resin composition according to the invention.

The prepolymers for use in the resin compositions of the invention may comprise only carbonate linkages, for example, those prepolymers fabricated from either first cyclic carbonate 202 or second cyclic carbonate 206 only. Alternatively, the polycarbonate prepolymers may be further reacted in a chain extension reaction using a diisocyanate (e.g. diisocyanate 208) to produce alternative prepolymers comprising one or more urethane linkages.

Figure 3A:
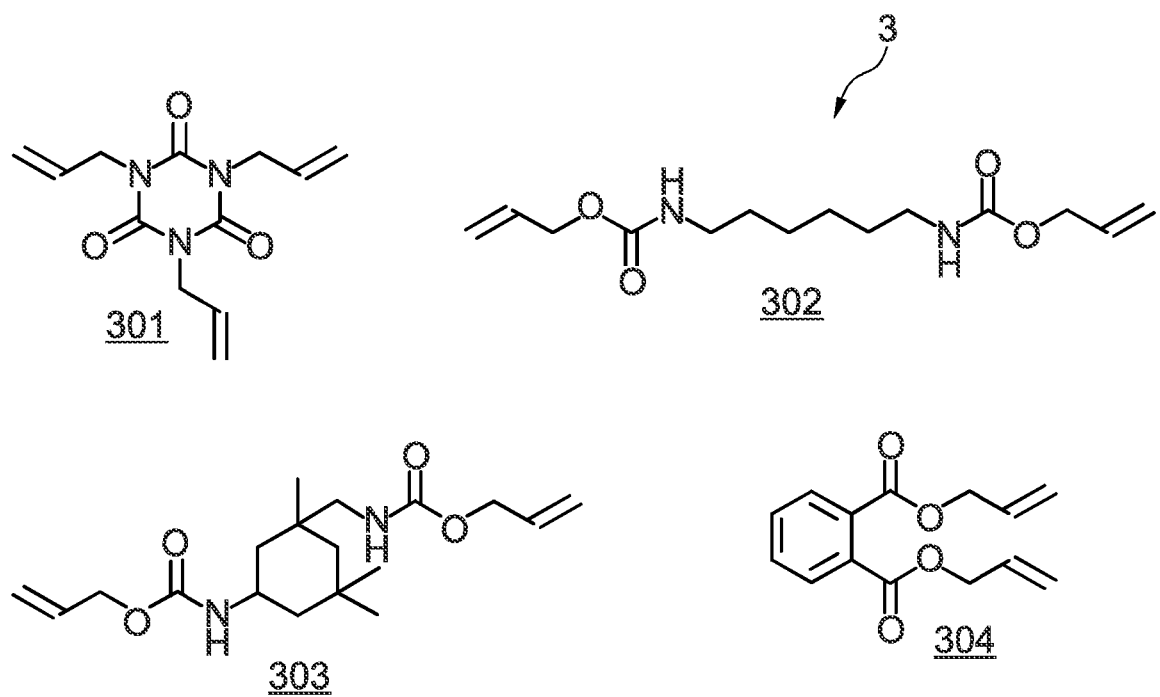
FIG. 3A is a selection of different types of diluent for use in the resin composition according to embodiments of the invention.

Referring now to FIG. 3A, there is shown different types of diluent 3, according to embodiments of the invention. There is shown a first diluent 301, a second diluent 302, a third diluent 303, and a fourth diluent 304. The first diluent 301 is 1,3,5-triallyl-1,3,5-triazine-2,4,6(1H,3H,5H)-trione, the second diluent 302 is 6-(allyloxycarbonylamino)hexylamino 3-butenoate, the third diluent 303 is 3-[(allyloxycarbonylamino)methyl]-3,5,5-trimethylcyclohexylamino 3-butenoate, and the fourth diluent 304 is diallyl phthalate.

Figure 3B:
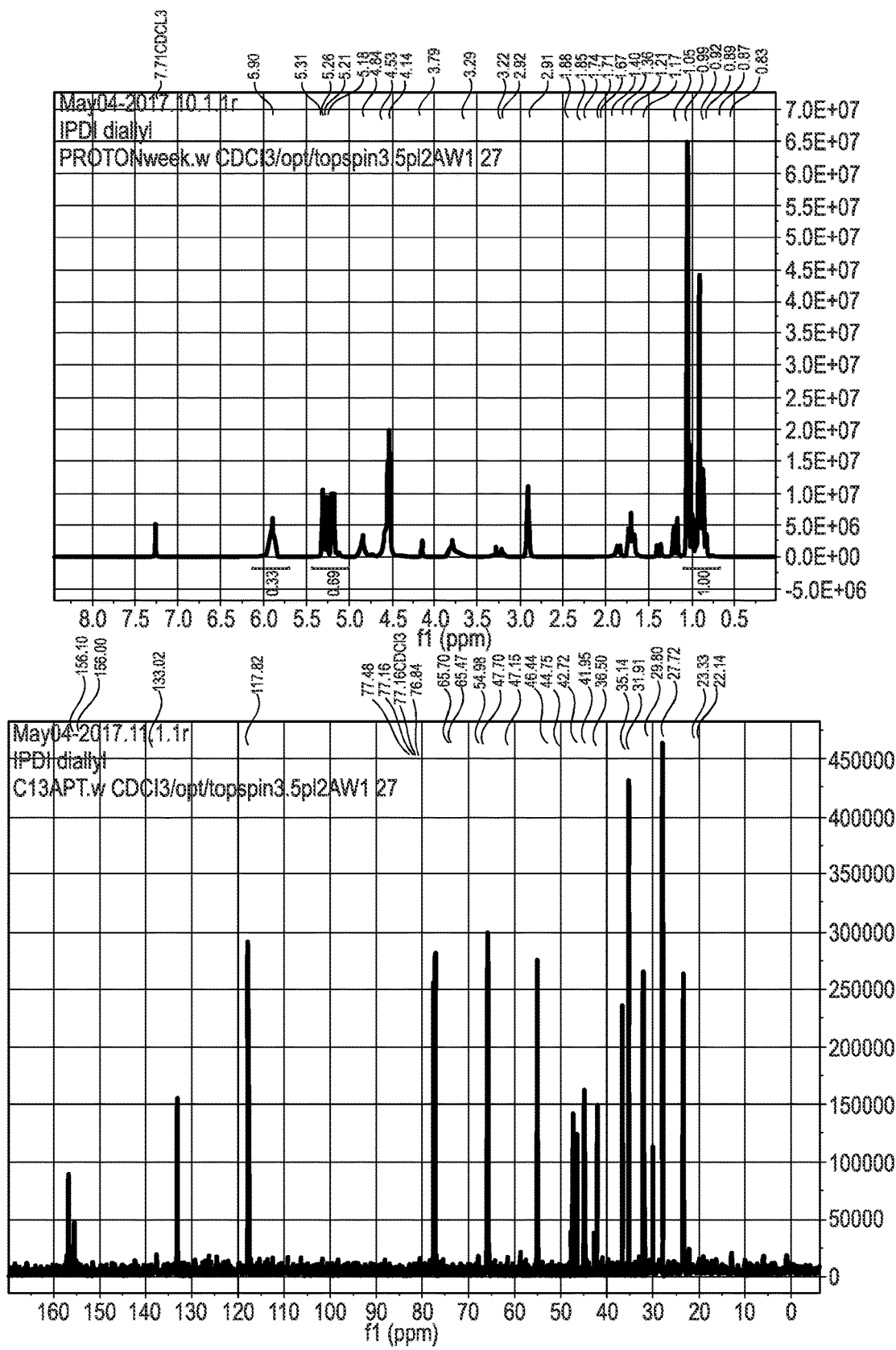
FIG. 3B is the $^1$H NMR spectrum and the $^{13}$C NMR spectrum of the diluent 303.

Referring also to FIG. 3B, there is shown the $^1$H NMR spectrum and the $^{13}$C NMR spectrum of the diluent 303.

Each of the first, second, third, and fourth diluent 301, 302, 303 and 304 comprise two or more unsaturated side-chains. In this embodiment, in each case the unsaturated side-chains comprise an alkene moiety.

Figure 4:
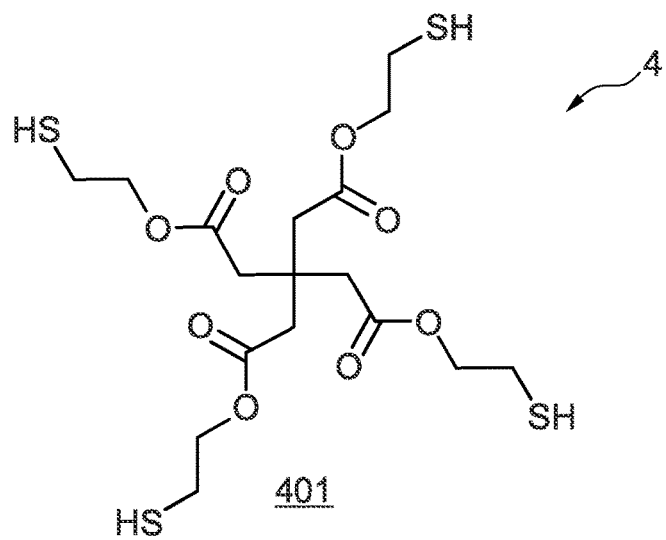
FIG. 4 is a cross-linker for use in the resin composition according to embodiments of the invention.

Referring now to FIG. 4, there is shown a cross-linker 4 according to an embodiment of the invention. In this embodiment, the cross-linker 401 is pentaerythritol tetrakis (3-mercaptopropionate). The thiol moieties of the cross-linker 401 are capable of reacting with unsaturated moieites, specifically unsaturated side-chains of the prepolymer 209 and of the first, second, third, and fourth diluent 301, 302, 303, and/or 304.

In embodiments, the prepolymer 209 is combined with the cross-linker 401, and one or more of the first, second, third, and fourth diluent 301, 302, 303 and/or 304, to produce a range of resin compositions.

In alternative embodiments, a prepolymer (not shown) may be fabricated from the first cyclic carbonate 202 only. In alternative embodiments, a prepolymer (not shown) may be fabricated from the second cyclic carbonate 206 only. In embodiments, the prepolymer (not shown) may comprise a copolymer of the first cyclic carbonate 202 and the second cyclic carbonate 206. These may or may not be chain extended using a diisocyanate (e.g. diisocyanate 208).

One or more of the prepolymers described may be combined with the cross-linker 401, and one or more of the first, second, third, and fourth diluent 301, 302, 303 and/or 304, to produce a range of resin compositions according to the invention, for fabrication into cross-linked polymers according to the invention.

The components of the resin compositions, i.e. the prepolymer, the diluents, and/or the cross-linker, for fabricating the cross-linked polymers of the invention may be added in different amounts to tune or vary the properties, e.g. degradability, shape memory properties, of the resulting cross-linked polymer. In embodiments wherein the prepolymer comprises a urethane linkage, the quantity of the diluent in the resin composition may be 0 wt. %. In this case, the prepolymer may be capable of directly cross-linking to moieties on or within the prepolymer itself and/or to a cross-linker.

Advantageously, the type of prepolymer and/or reactive diluent and/or cross-linker that is added to the resin composition to fabricate the cross-linked polymers of the invention may be varied to tune the properties of the cross-linked polymer. For example, the structure of the prepolymer may be varied by using different types and/or concentrations of monomer to fabricate the prepolymer. In embodiments, the prepolymer is fabricated from one type of carbonate monomer. In other embodiments, the prepolymer is fabricated from more than one type of carbonate monomer. The concentration of each monomer in the prepolymer may be adjusted or varied to tune the properties of the resulting cross-linked polymer. In embodiments, the prepolymer may be chain extended using an isocyanate to provide a urethane linkage in the prepolymer. The type of isocyanate in the prepolymer may be varied to tune the properties of the resulting cross-linked polymer that is fabricated from a resin composition containing the prepolymer.

The cross-linked polymer of the invention comprises one or more urethane and/or urea linkage. The origin of the urethane linkage is from one or more of a urethane linkage in the prepolymer and/or one or more diluents 302 and/or 303. For example, the prepolymer need not comprise a urethane linkage, e.g. the prepolymer may be a polycarbonate that consists of carbonate linkages only. In this case, the origin of the urethane and/or urea linkage(s) is from the diluents 302 and/or 303 only.

Alternatively, the prepolymer for use in the resin compositions of the invention may comprise carbonate linkages in addition to one or more urethane linkages. In this case, the origin of the urethane and/or urea linkage(s) is from the prepolymer (e.g. prepolymer 209) and may also be (but need not be) from the diluents 302 and/or 303.

The resin compositions were combined with a photoinitiator and were printed using a microstereolithographic apparatus to produce cross-linked polymers.

Figure 5:
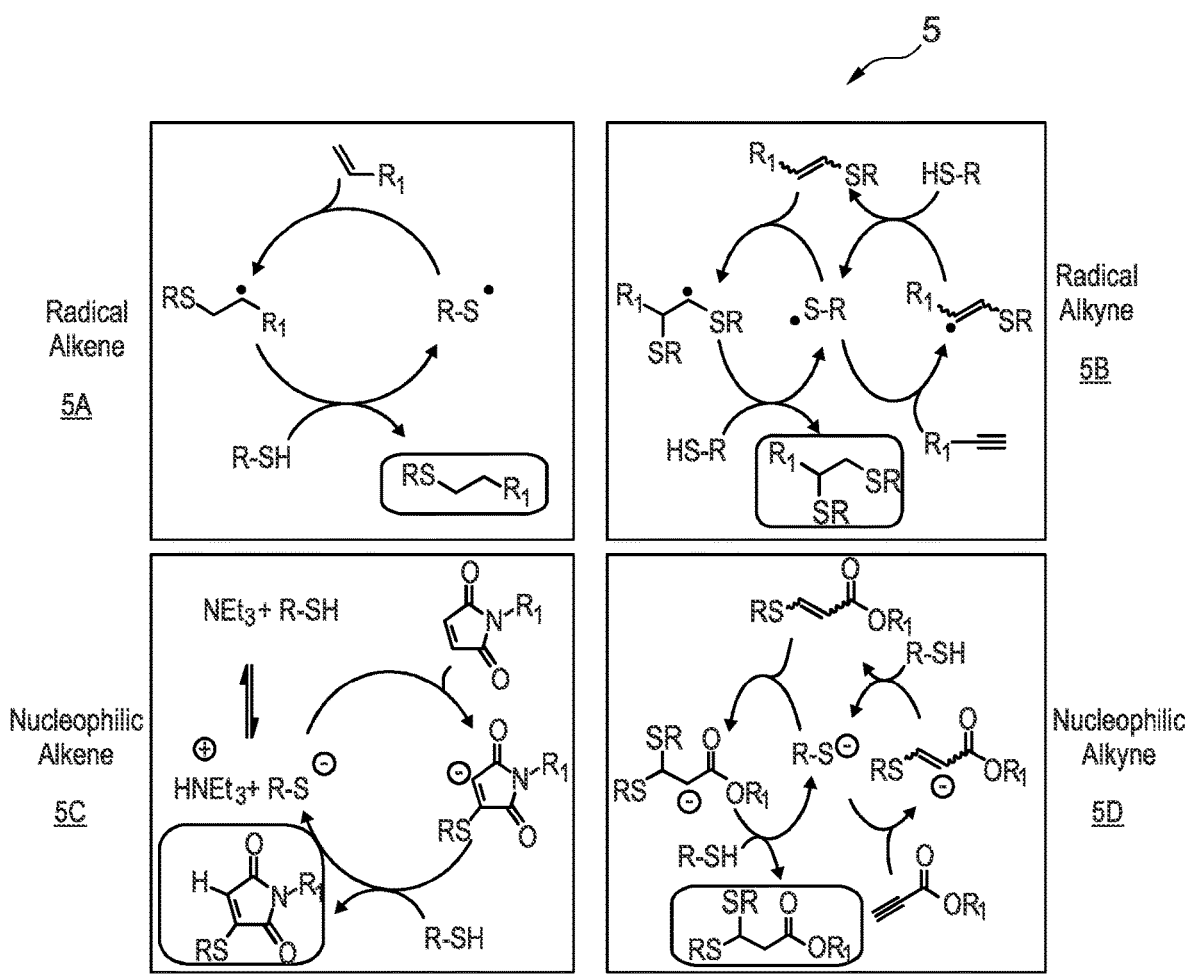
FIG. 5 shows a series of schematic reaction mechanisms that may be used to cross-link the pre-polymer with the cross-linker, according to some embodiments of the invention.

Referring now to FIG. 5, there is shown a series of schematic reaction mechanisms 5 that may be used to cross-link the prepolymer, e.g. 209, with the cross-linker, e.g. 401, according to embodiments of the invention. There is shown a radical alkene mechanism 5A, a radical alkyne mechanism 5B, a nucleophilic alkene mechanism 5C, and a nucleophilic alkyne mechanism 5D.

In embodiments, the cross-linker, e.g. cross-linker 401, comprises multiple thiol moieties. The thiol moieties of the cross-linker, e.g. cross-linker 401, may react with the unsaturated side-chains of the prepolymer, e.g. 209, and/or the diluent(s) 301, 302, 303, and/or 304. Wherein the unsaturated side-chains comprise an alkene moiety, and the resin composition is combined with a radical initiator, e.g. a photoinitiator, then the cross-linking reaction between oligomer chains of the prepolymer, e.g. 209 and the cross-linker, e.g. 401, and/or the diluents, e.g. 301, 302, 303 and/or 304, may proceed via the radical alkene mechanism 5A.

Wherein the unsaturated side-chains comprise an alkyne moiety, and the resin composition is combined with a radical initiator, e.g. a photoinitiator, then the cross-linking reaction between oligomer chains of the prepolymer, e.g. 209 and the cross-linker, e.g. 401, and/or the diluents, e.g. 301, 302, 303 and/or 304, may proceed via the radical alkene mechanism 5B.

In contrast, the unsaturated side-chains of a prepolymer and/or a or the diluent(s) may comprise an alkene moiety comprising an electron withdrawing group, which may undergo a nucleophilic addition reaction with the cross-linker, for example, a nucleophilic addition of a thiol moiety of a cross-linker, e.g. cross-linker 401, in nucleophilic alkene mechanism 5C.

Alternatively, unsaturated side-chains of a prepolymer and/or a or the diluent(s) may comprise an alkyne moiety comprising an electron withdrawing group, which may undergo a nucleophilic addition reaction with the cross-linker, for example, a nucleophilic addition of a thiol moiety of a cross-linker, e.g. cross-linker 401, in nucleophilic alkyne mechanism 5D.

The cross-linking processes described above may be performed on an apparatus for microstereolithography (not shown), which 3D prints each layer of the cross-linked polymer, by providing a initiator, e.g. a photoinitiator and a light source, to cure the cross-linked polymer.

Advantageously, the quantity of prepolymer and/or diluent and/or and/or cross-linker may be altered to afford a range of cross-linked polymer with different properties, e.g. mechanical properties, glass transition temperatures ($T_g$), degradability, and so on. In this way, the properties of the cross-linked polymer of the present invention may be tuned depending on the application. The type of diluent(s) may also be varied to afford cross-linked polymers with different properties.

Figure 6:
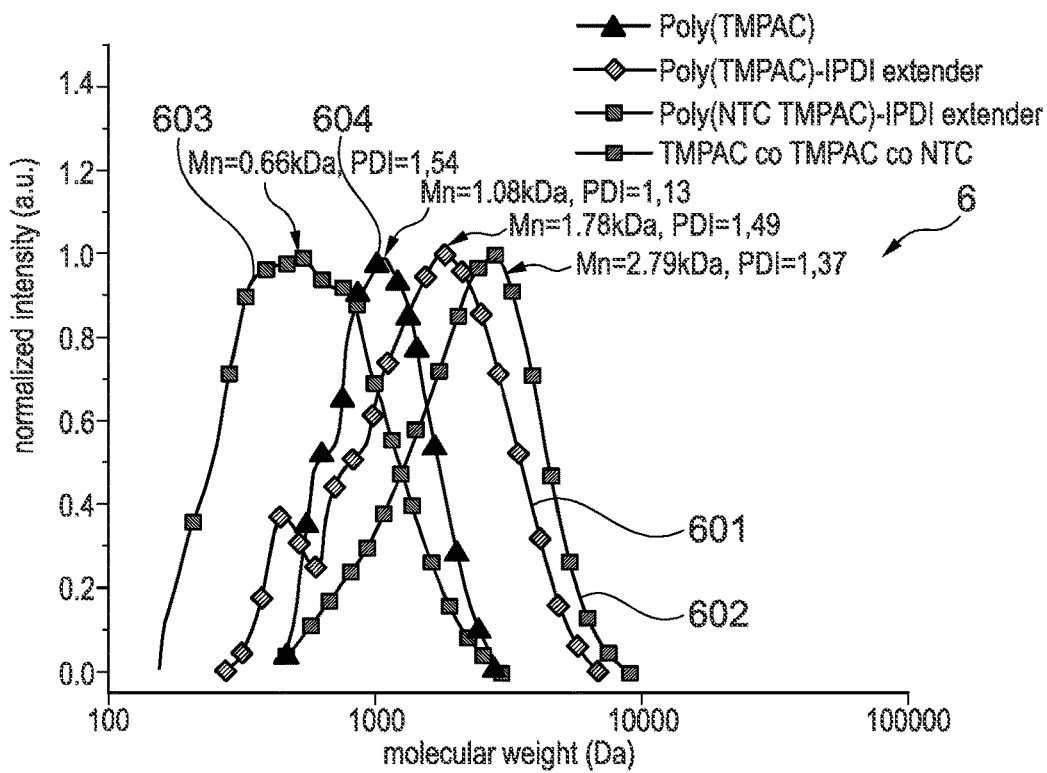
FIG. 6 shows a graph of the distribution of molecular weights of prepolymers for use in resin compositions according to embodiments of the invention.

Referring now to FIG. 6, there is shown a graph 6 showing the distribution of molecular weights of prepolymers that may be used in resin compositions to fabricate cross-linked polymers according to embodiments of the invention. There is shown the distribution of molecular weights for prepolymers 601, 602, 603, and 604.

The prepolymer 601 was fabricated via chain extension of an oligomer fabricated from first cyclic carbonate 202 (shown in FIG. 2A) with isophorone diisocyanate 208 (shown in FIG. 2A).

The prepolymer 602 is the prepolymer 209 (shown in FIG. 2A).

Prepolymer 603 is a polycarbonate prepolymer comprising an alternating copolymer of first cyclic carbonate 202 and second cyclic carbonate 206, which underwent iodination. No urethane linkages are present in prepolymer 603.

Prepolymer 604 is a polycarbonate prepolymer was fabricated from a homopolymer of first cyclic carbonate 202. No urethane linkages are present in prepolymer 604.

The molecular weights ($M_n$) of the prepolymers 601 and 602 are higher than those of the prepolymers 603 and 604. This is because the chains of the prepolymers 601 and 602 have been chain extended using the diisocyanate 208, whereas the cross-linked polymers 603 and 604 are polycarbonates only, and did not undergo chain extension to produce a urethane linkage.

Figure 7:
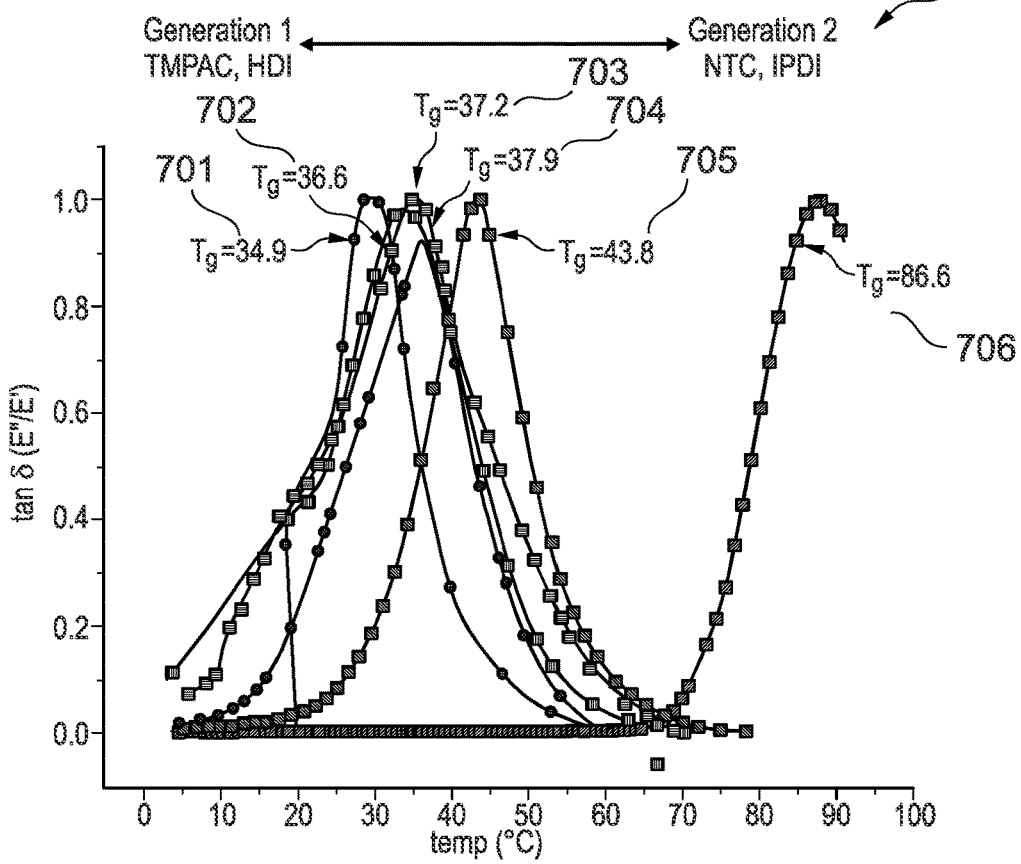
FIG. 7 is a graph showing the glass transition temperatures ($T_g$) of the cross-linked polymers, according to some embodiments of the invention.

Referring now to FIG. 7, there is shown a graph 7 showing the glass transition temperatures ($T_g$) of the cross-linked polymers, according to embodiments of the invention. The glass transition temperature ($T_g$) is shown for the cross-linked polymers 701, 702, 703, 704, 705, and 706.

The cross-linked polymers 701, 702, 703, 704, and 705 were fabricated from a resin composition comprising a prepolymer, the prepolymer being fabricated via chain extension of prepolymer 604 with hexamethylene diisocyanate (HDI). The cross-linked polymers 701, 702, 703, 704, and 705 were fabricated in the absence of diluents.

The cross-linked polymer 706 was fabricated from a resin composition comprising a prepolymer (not shown), the prepolymer being fabricated via chain extension of an oligomer consisting of the second cyclic carbonate 206 reacted with isophorone diisocyanate 208. The cross-linked polymer 706 was fabricated from a resin composition comprising the first diluent 301 and the third diluent 303 (shown in FIG. 3A).

The glass transition temperature ($T_g$) of the cross-linked polymers 701, 702, 703, 704, and 705 ranged from below 0° C. to above nearly 45° C. In contrast, the cross-linked polymer 706 had a glass transition temperature ($T_g$) of 86.6° C. Without wishing to be bound any by theory, it is thought that this is a result of the flexible carbonate linkages and plasticising side groups, i.e. the allyl side-chains, in the cross-linked polymers 701, 702, 703, 704, and 705, which comprises the first cyclic carbonate 202. These structural features act to lower the glass transition temperature ($T_g$).

In contrast, the cross-linked polymer 706 exhibited the highest glass transition temperature ($T_g$). Without wishing to be bound by any theory, it is thought that provision of first diluent 301 and third diluent 303 (shown in FIG. 3A) in the resin composition used to fabricate cross-linked polymer 706, provide greater steric hindrance, in addition to the more 'rigid' second cyclic carbonate 206, both effects of which contribute to increase the glass transition temperature ($T_g$).

Therefore, the cross-linked polymers of the present invention may be tuned to exhibit different glass transition temperature ($T_g$) by addition of different types and quantities of diluent.

Figure 8A:
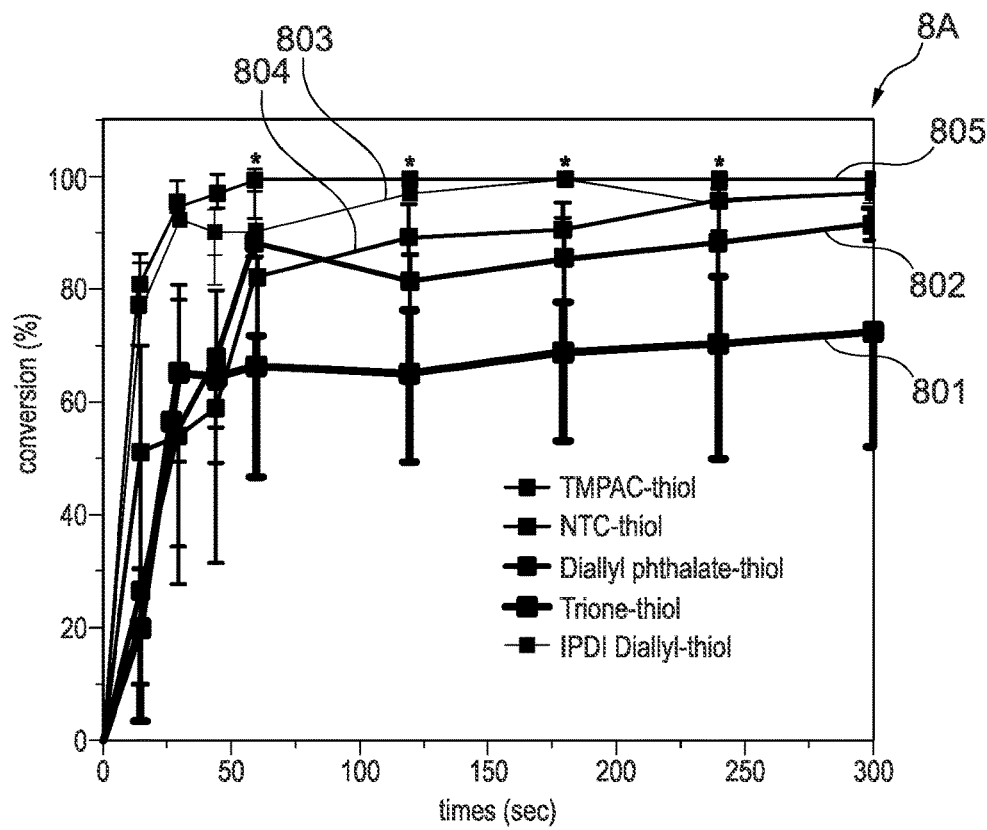
FIG. 8A is a graph showing the curing kinetics of components of resin compositions.

Referring now to FIG. 8A, there is shown a graph 8A showing the curing kinetics of components of the resin composition of the invention. There is shown the curing kinetics for the reactions 801, 802, 803, 804, and 805.

Reaction 801 comprised the cross-linker 401 and the diluent 304. The ene:thiol ratio was 1:1 with 0.1 wt. % initiator.

Reaction 802 comprised the prepolymer 102 shown in FIG. 1 and the cross-linker 401. The ene:thiol ratio was 1:1 with 0.1 wt. % initiator.

Reaction 803 comprised the cross-linker 401 and the diluent 303. The ene:thiol ratio was 1:1 with 0.1 wt. % initiator.

Reaction 804 comprised the prepolymer 207 and the cross-linker 401. The ene:thiol ratio was 1:1 with 0.1 wt. % initiator.

Reaction 805 comprised the cross-linked 401 and the diluent 301. The ene:thiol ratio was 1:1 with 0.1 wt. % initiator.

In these reactions, stoichiometric amounts of alkenes with the cross-linker 401 (20 mg) were added to 600 microlitres of $CDCl_3$ with 1% (wt) Irgacure 814 and added to NMR tubes. The samples were cured at 405 nm.

The highest conversion was observed for reaction 805. The curing kinetics shown for reaction 805 in graph 8A indicate that the diluent 301 is most reactive with the cross-linker 401.

The lowest conversion was observed in the reaction 801. This shows that the diluent 304 may be used to decrease the conversion or as a method for spatial temporal control.

Figure 8B:
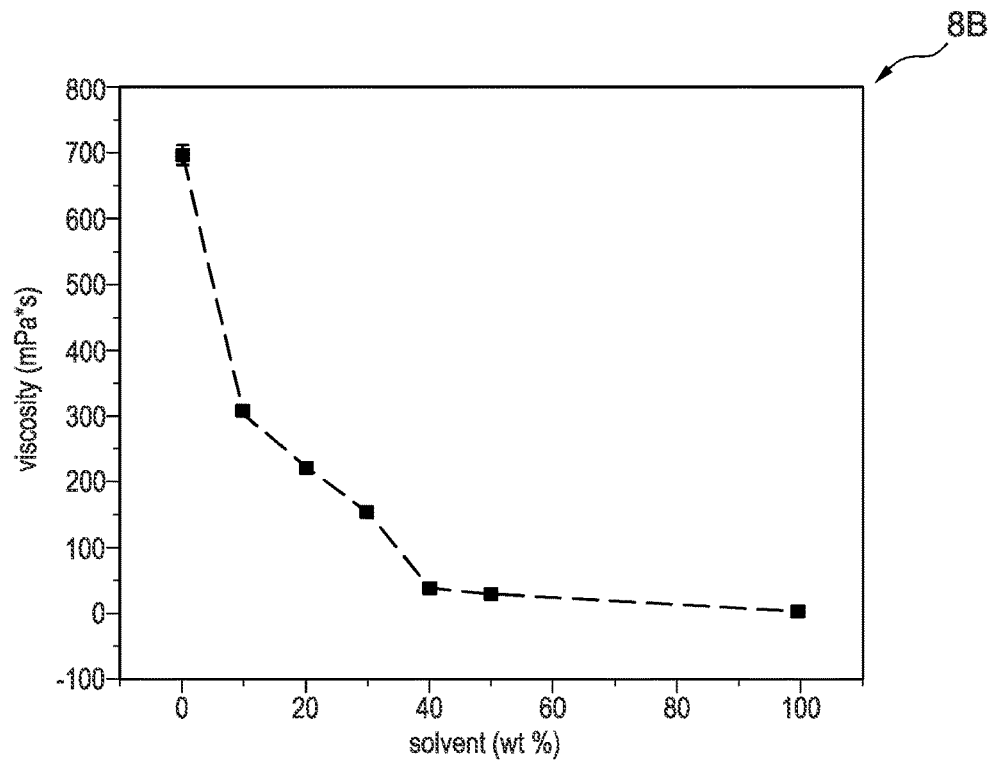
FIG. 8B is a graph showing the viscosity of the resin composition when using different concentrations of diluent, according to some embodiments of the invention.

Referring now to FIG. 8B, there is shown a graph 8B showing the viscosity of the resin composition when using different concentrations of diluent, according to some embodiments of the invention. The inclusion of solvent was utilized to reduce resin viscosity and achieve higher print resolution, with greater than 40% wt appearing to result in both diminishing returns and reduced print viability due to both shrinkage and mechanical failure. Photoinitiator concentration of less than 0.5% wt was found to provide rapid curing of the polymer system, as determined through rheological testing.

Figure 8C:
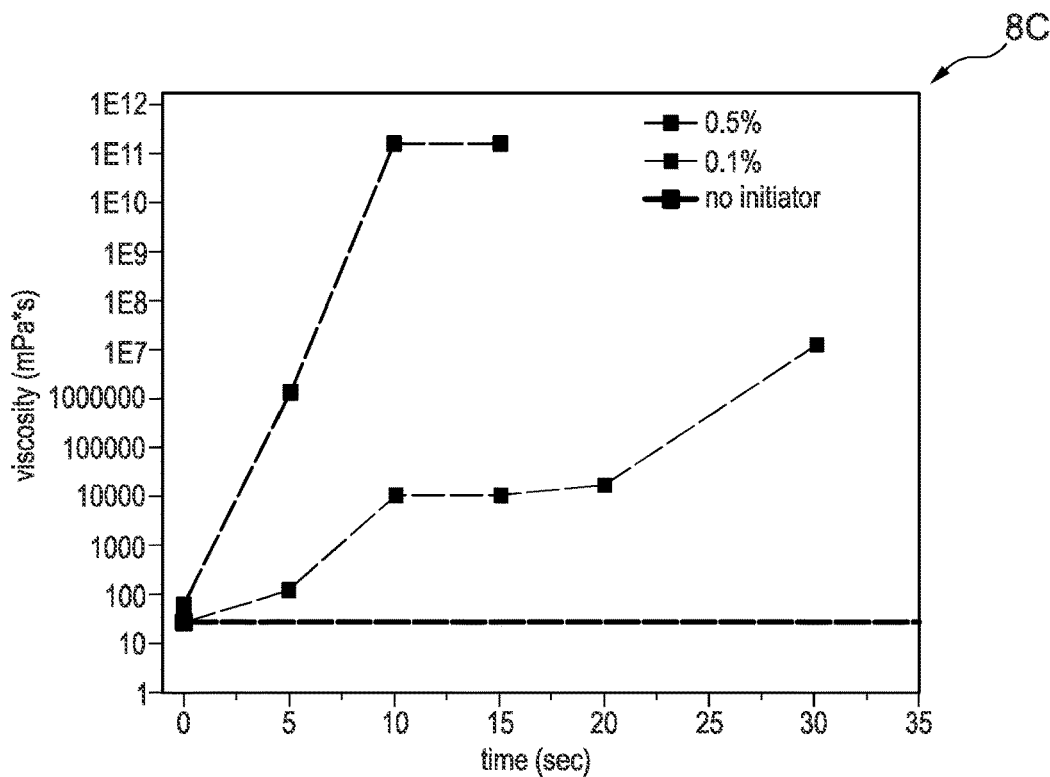
FIG. 8C is a graph showing the viscosity of the resin composition versus time, when using different concentrations of photoinitiator, according to some embodiments of the invention.
Figure 8D:
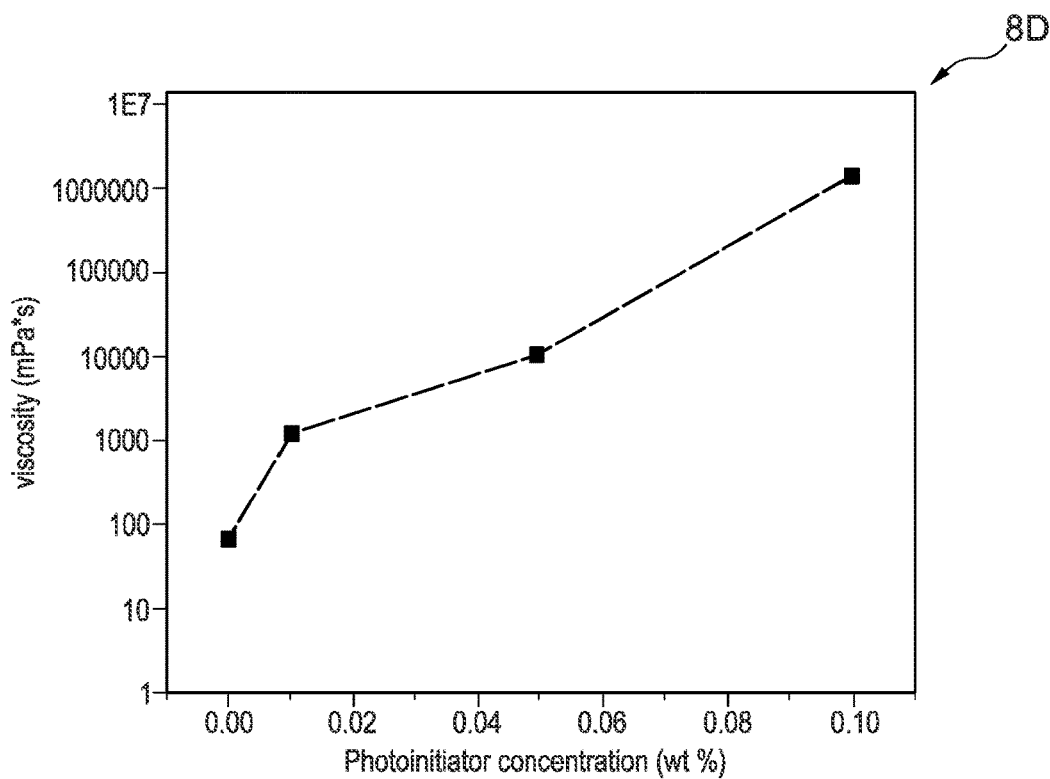
FIG. 8D is a graph showing the viscosity of the resin composition versus concentration of photoinitiator, according to some embodiments of the invention.

Referring now to FIG. 8C, there is shown a graph 8C of the viscosity of the resin composition versus time, when using different concentrations of photoinitiator, according to some embodiments of the invention. Referring also to FIG. 8D, there is shown a graph 8D of the viscosity of the resin composition versus concentration of photoinitiator, according to some embodiments of the invention. A photoinitiator concentration of less than 0.5 wt. % was shown to provide rapid curing of the polymer system, as determined through rheological testing. The viscosity of the resin composition increased as the concentration of the photoinitiator was increased within the resin composition.

Advantageously, the resin compositions of the present invention exhibit viscosities that are highly processable in additive manufacturing techniques, for example, on stereolithographic apparatus. This enables the resin compositions of the present invention to be used to fabricate devices with highly complex microarchitectures, such devices with as uniform porosity.

Figure 9:
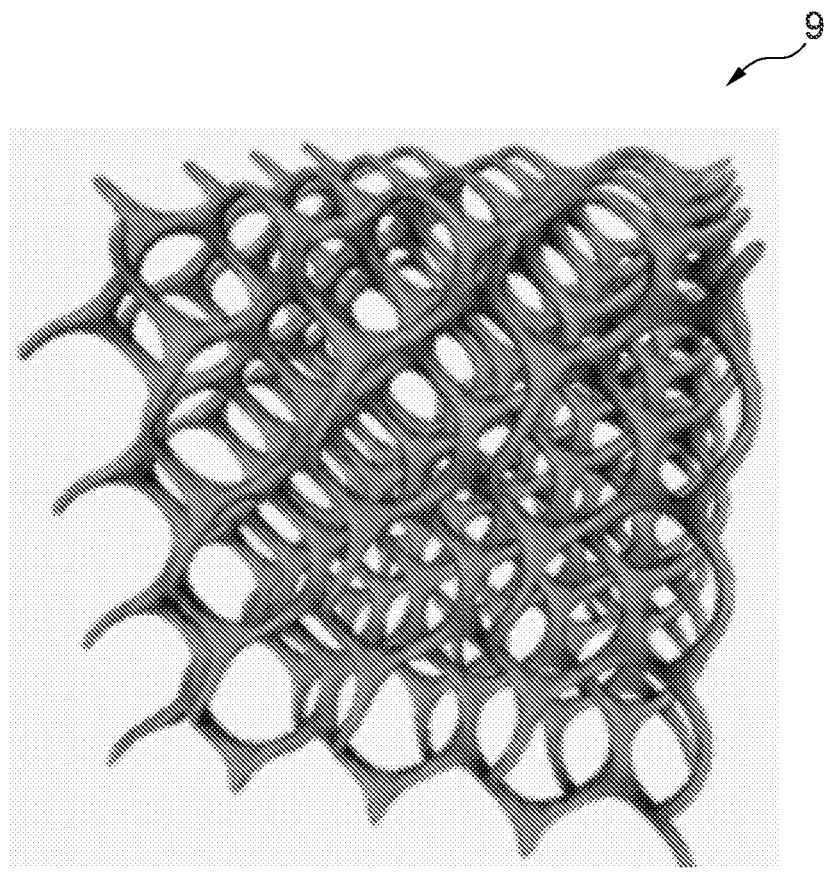
FIG. 9 is a device comprising a cross-linked polymer with shape memory properties, according to embodiments of the invention.

Referring now to FIG. 9, there is shown a device 9 comprising a cross-linked polymer with shape memory properties, according to embodiments of the invention. The device 9 was printed using a microstereolithographic process. The resin composition was contacted with a photoinitiator, and the microstereolithography apparatus provided the UV light necessary to cure the resin composition into a cross-linked polymer of device 9. The device 9 is porous, and may be used as tissue scaffold, for example.

Advantageously, when the resin compositions were printed using microstereolithography, no photoinhibitor was needed to achieve the desired resolution, and print times were averaged at 10 to 30 seconds per slice, with more porous, i.e. smaller struts and lower porosity, materials required longer exposure times.

The device 9 was printed with a range of pore sizes ranging from 200 μm to 1500 μm. Advantageously, this has been shown to provide an ideal pore size range for a range of biomedical applications, e.g. wherein the device 9 is a tissue scaffold, for cell growth. Porosities ranging from 0.7 to 0.95 were achievable based on 10.3 tessellation geometry.

Advantageously, using a microstereolithographic process with the resin compositions of the present invention, the design of the device 9 may be manipulated to provide different surface area, pore interconnectivity, specific morphology. More advantageously, the intricacy of the design of the device 9 is not limited or constrained by the processability of the resin composition, or the mechanical properties of the resulting cross-linked polymer. The design manipulation of device 9 for fabrication using a microstereolithographic process may be achieved using image manipulation and freeware design software. Advantageously, this method of fabricating device 9 was reproducible using resin compositions, e.g. cross-linked polymers fabricated from prepolymers and cross-linker 401 in a ratio of 1:1 ene to thiol, the prepolymers fabricated from first cyclic carbonate 202, wherein the only variable was the exposure time of the UV light to the resin composition to cure the cross-linked polymer.

Figure 10A:
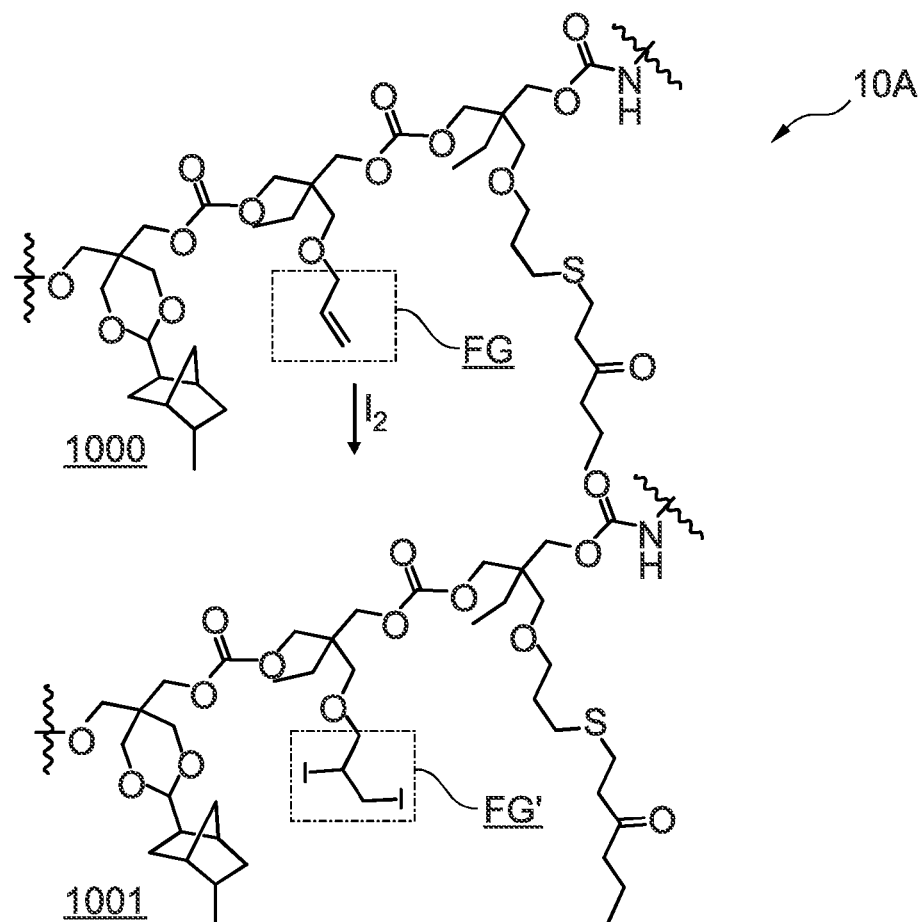
FIG. 10A is a schematic reaction showing iodination post-polymerisation functionalisation of the cross-linked polymer, according to embodiments of the invention.

Referring now to FIG. 10A, there is shown a schematic reaction 10A of iodination post-polymerisation functionalisation of the cross-linked polymer 1000, according to embodiments of the invention. In the schematic reaction 10A, there is shown the cross-linked polymer 1000, and an iodinated cross-linked polymer 1001. The cross-linked polymer 1000 comprises a functional group FG, which in this embodiment is an alkene side-chain. Post-polymerisation, i.e. after the resin composition comprising prepolymer 209 was fabricated into the cross-linked polymer 1000 using the stereolithography apparatus, the cross-linked polymer 1000 underwent reaction with iodine, $I_2$, across the functional group FG to produce the iodinated cross-linked polymer 1001.

Figure 10B:
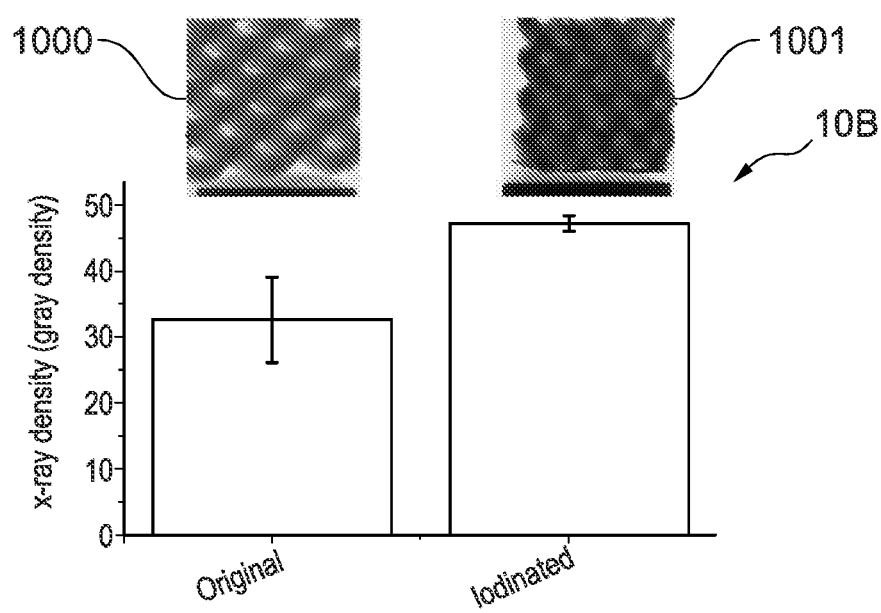
FIG. 10B is a graph comparing the x-ray density of non-iodinated and iodinated cross-linked polymer, according to embodiments of the invention.

Referring also to FIG. 10B, there is shown a graph 10B comparing the x-ray density of the cross-linked polymer 1000 and the functionalised cross-linked polymer 1001, according to embodiments of the invention. The graph 10B shows that the iodinated cross-linked polymer 1001 exhibits a greater x-ray density in comparison with the non-iodinated cross-linked polymer 1000. Therefore, the iodinated cross-linked polymer 1001 is visible under clinical imaging such as angiography. This is advantageous for applications wherein the iodinated cross-linked polymer 1001 is a tissue scaffold so that the device, e.g. device 9, can be located within the patient, for example, to determine the degradation rate of the iodinated cross-linked polymer 9 within the device 9.

In addition, the iodinated cross-linked polymer 1001 has the following properties in comparison with the non-iodinated cross-linked polymer 1000: (i) the polymer density is increased; (ii) the iodinated cross-linked polymer 1001 is more mechanically stable in comparison with the non-iodinated cross-linked polymer 1000; (iii) reduced rates of mass loss and swelling are observed in comparison with the non-iodinated cross-linked polymer 1000.

Figure 11A:
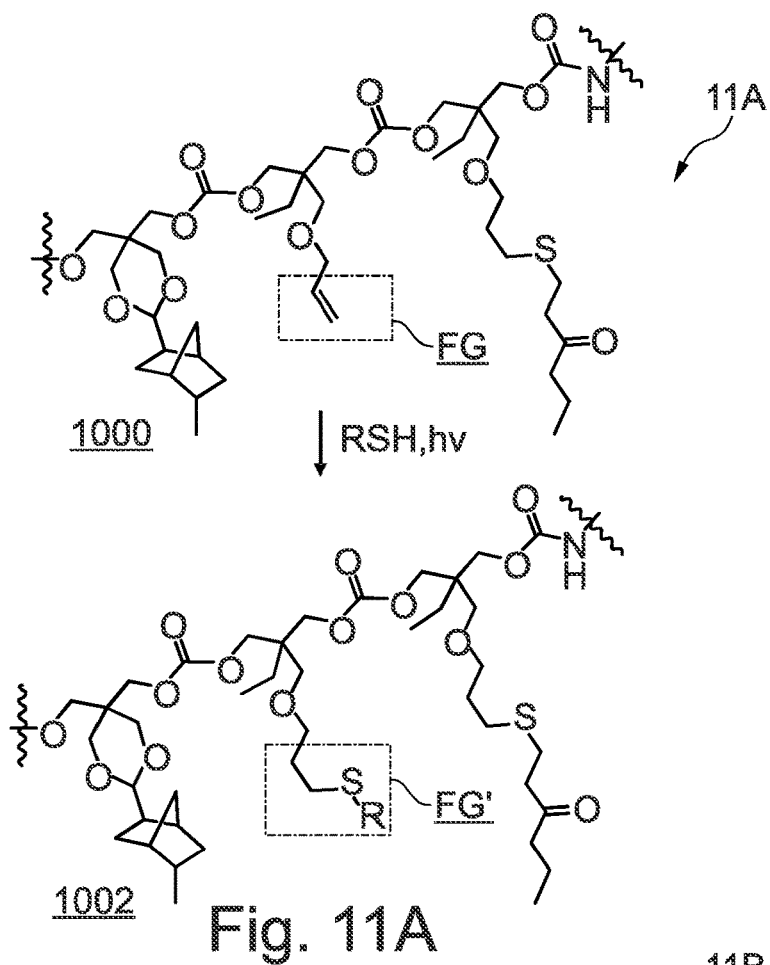
FIG. 11A is a schematic reaction showing alkylation post-polymerisation functionalisation of the cross-linked polymer, according to embodiments of the invention.

Referring now to FIG. 11A, there is shown is a schematic reaction 11A showing alkylation post-polymerisation functionalisation of the cross-linked polymer 1000, according to embodiments of the invention. In the schematic reaction 11A, there is shown the cross-linked polymer 1000, and an alkylated cross-linked polymer 1002. The cross-linked polymer 1000 comprises a functional group FG, which in this embodiment is an alkene side-chain. Post-polymerisation, i.e. after the resin composition 209 was printed into the cross-linked polymer 1000 using the stereolithography apparatus, the cross-linked polymer 1000 underwent reaction with dodecane thiol RSH, across the functional group FG to produce the alkylated cross-linked polymer 1002. This reaction occurred across the surface of the cross-linked polymer 1000.

Figure 11B:
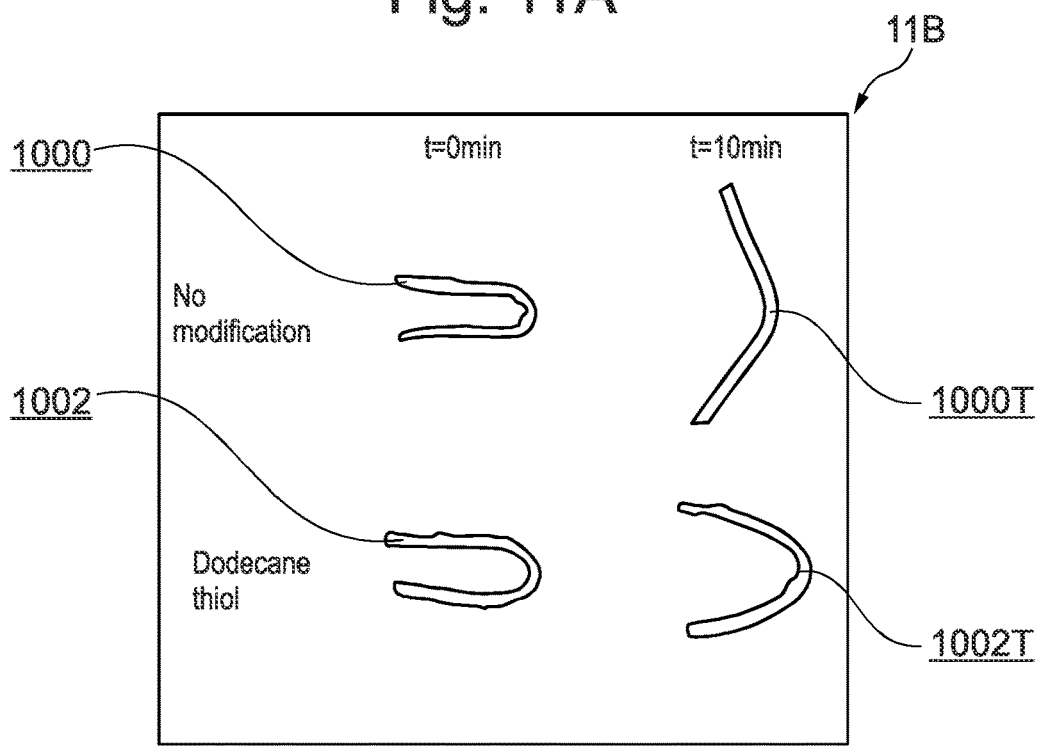
FIG. 11B is a photograph of a comparison of two cross-linked polymers showing the effect of alkylation post-polymerisation functionalisation to increase the hydrophobicity, according to an embodiment of the invention.

Referring also to FIG. 11B, there is shown a photograph 11B of a comparison the cross-linked polymer 1000 and the alkylated cross-linked polymer 1002, illustrating the increase in the hydrophobicity upon alkylation, according to an embodiment of the invention. There is shown the cross-linked polymer 1000, which was not alkylated or modified post-polymerisation, and the alkylated cross-linked polymer 1002. The cross-linked polymer 1000 and the alkylated cross-linked polymer 1002 were soaked in water, removed, and the strain recovery was monitored over a period of ten minutes to produce cross-linked polymer after ten minutes 1000T and alkylated cross-linked polymer after ten minutes 1002T. The photograph 11B shows that the rate of strain recovery in the alkylated cross-linked polymer after ten minutes 1002T was slowed in comparison with the rate of strain recovery in the cross-linked polymer after ten minutes 1000T.

The introduction of an alkyl chain moiety to produce the alkylated cross-linked polymer 1002, e.g. a dodecane alkyl chain moieties, had the following effects in comparison to the cross-linked polymer 1000: (i) the glass transition temperature ($T_g$) did not change upon alkylation, i.e. the glass transition temperature ($T_g$) of the cross-linked polymer 1000 is substantially the same as that of the alkylated cross-linked polymer 1002; (ii) the hydrophobicity increased, i.e. the influx of water was altered. Therefore, the rate of strain recovery, shape memory, volume recovery, and/or shape recovery of the cross-linked polymer may be tuned with alkylation.

Advantageously, the functionalisation of the unsaturated side-chain of the cross-linked polymer, e.g. cross-linked polymer 1000, allows for further functionality to be introduced to the cross-linked polymer that may not be otherwise compatible with stereolithography, or other 3D printing techniques. Moreover, the functionalisation of the cross-linked polymer 1000 is not limited to iodination or alkylation. Other functionalisation may be performed on the unsaturated side-chain, e.g. addition of bromine to an alkene moiety, click chemistry of an azide to an alkyne moiety, and any other functionalisation of an unsaturated side-chain.

Figure 12A:
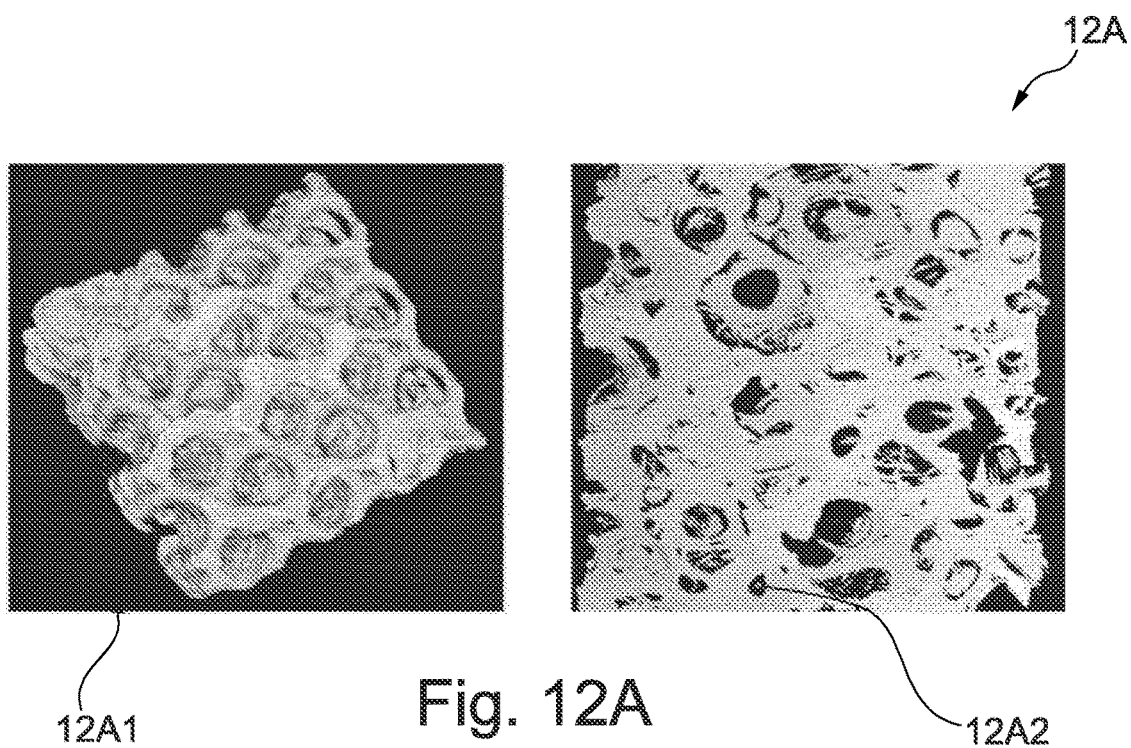
FIG. 12A is computed tomography (CT) reconstruction of a 3D printed cross-linked polymer according to an embodiment of the invention, and a comparative example showing the porosity of a gas blown foam.
Figure 12B:
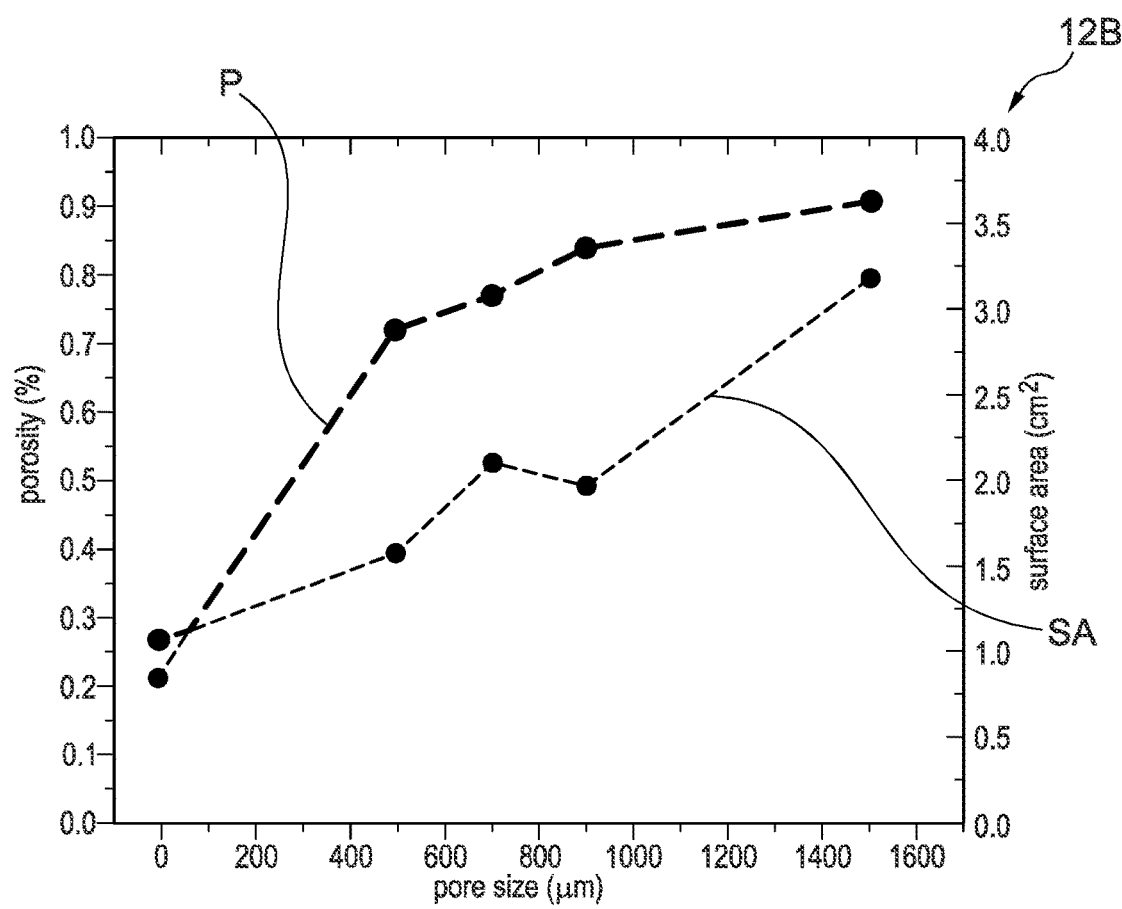
FIG. 12B is a graph showing the porosity and surface area versus the pore size of a 3D printed cross-linked polymer, according to an embodiment of the invention.

Referring now to FIG. 12A, there is shown two computed tomography (CT) images 12A; a reconstruction of a 3D printed cross-linked polymer 12A1 according to an embodiment of the invention, and an example showing the porosity of a gas blown foam polymer 12A2. Both the 3D printed polymer and the gas blown foam polymer were fabricated from an identical resin composition comprising a polycarbonate prepolymer, which was chain extended using IPDI, cross-linked with cross-linker 401, using propylene carbonate was used as a diluent. Referring also to FIG. 12B, there is shown a graph of the porosity (%), P, and also the surface area ($cm^{-1}$), SA, versus the pore size of the 3D printed cross-linked polymer 12A1 of FIG. 12A. The 3D printed cross-linked polymer 12A1 was printed using a microstereolithography process, which allows for a specific and ordered pore morphology to be controlled during the design and fabrication. In contrast, the example showing the porosity of a gas blow foam polymer 12A2, shows irregular pore morphology. The gas blown foam polymer 12A2 comprises a cross-linked polymer that is low density, has good shape memory performance, and has good biocompatibility. However, the morphological disparity throughout a single foam sample introduces numerous problems for long term usage in biomedical applications.

Advantageously, the cross-linked polymers of the present invention, comprise high porosity, high surface area, regular geometries and controlled physical attributes, which allow for their use in a wide range of applications, particularly medical applications.

Figure 13:
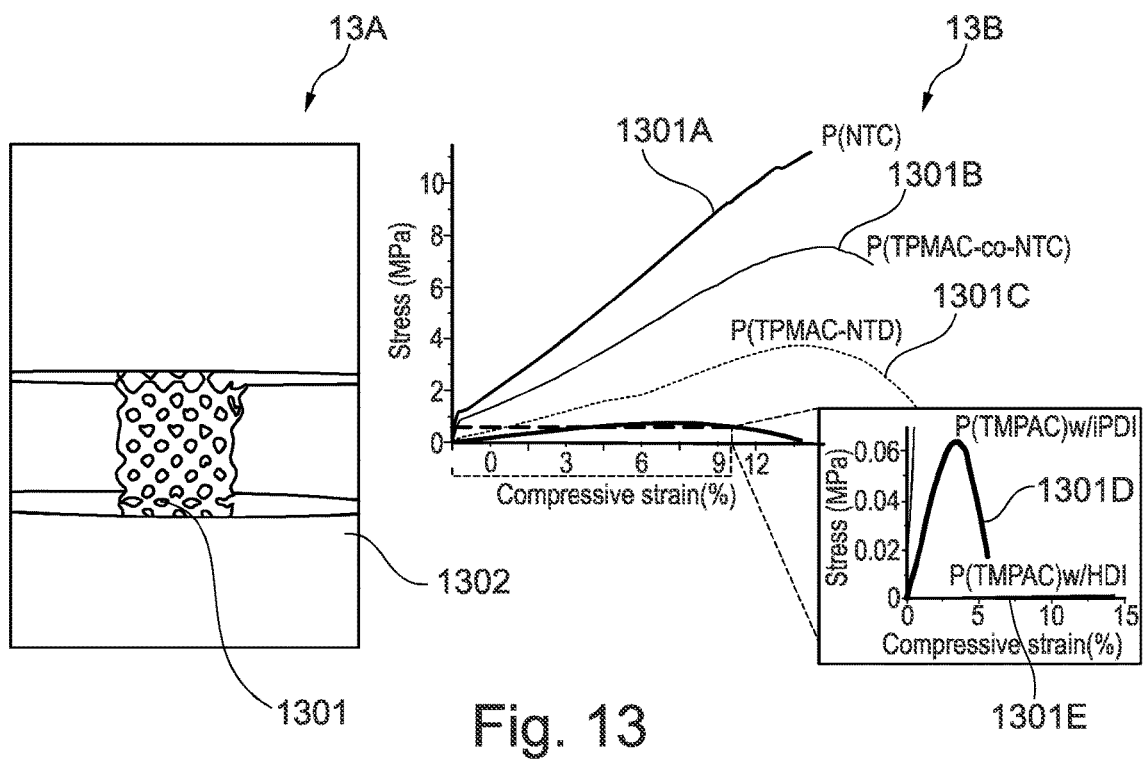
FIG. 13 is an experimental set-up and a graph showing the compressive mechanical properties of a 3D printed cross-linked polymer, according to an embodiment of the invention.

Referring now to FIG. 13, there is shown an experimental set-up 13A and a graph 13B showing the compressive mechanical properties of a 3D printed cross-linked polymer, according to an embodiment of the invention. In the experimental set-up 13A, there is shown a cross-linked polymer sample 1301 and a rig 1302 for applying stress to measure the compressive strain (%) of the cross-linked polymer sample 1301. In the graph 13B, there is shown the compressive strain (%) plotted against the stress (MPa) for a series of examples of the cross-linked polymer sample 1301, cross-linked polymers 1301A, 1301B, 1301C, 1301D, and 1301E. The cross-linked polymers 1301A, 1301B, 1301C, 1301D, and 1301E were tested wet at 37° C.

Cross-linked polymer 1301A was fabricated from the prepolymer 207.

Cross-linked polymer 1301B was fabricated from the prepolymer 209.

Cross-linked polymer 1301C was fabricated from the prepolymer 209.

Cross-linked polymer 1301D was fabricated from a prepolymer (not shown), the prepolymer comprising the prepolymer 102 and isophorone diisocyanate 208.

Cross-linked polymer 1301E was fabricated from a prepolymer (not shown), the prepolymer comprising the prepolymer 102 and hexamethylene diisocyanate.

Figure 14:
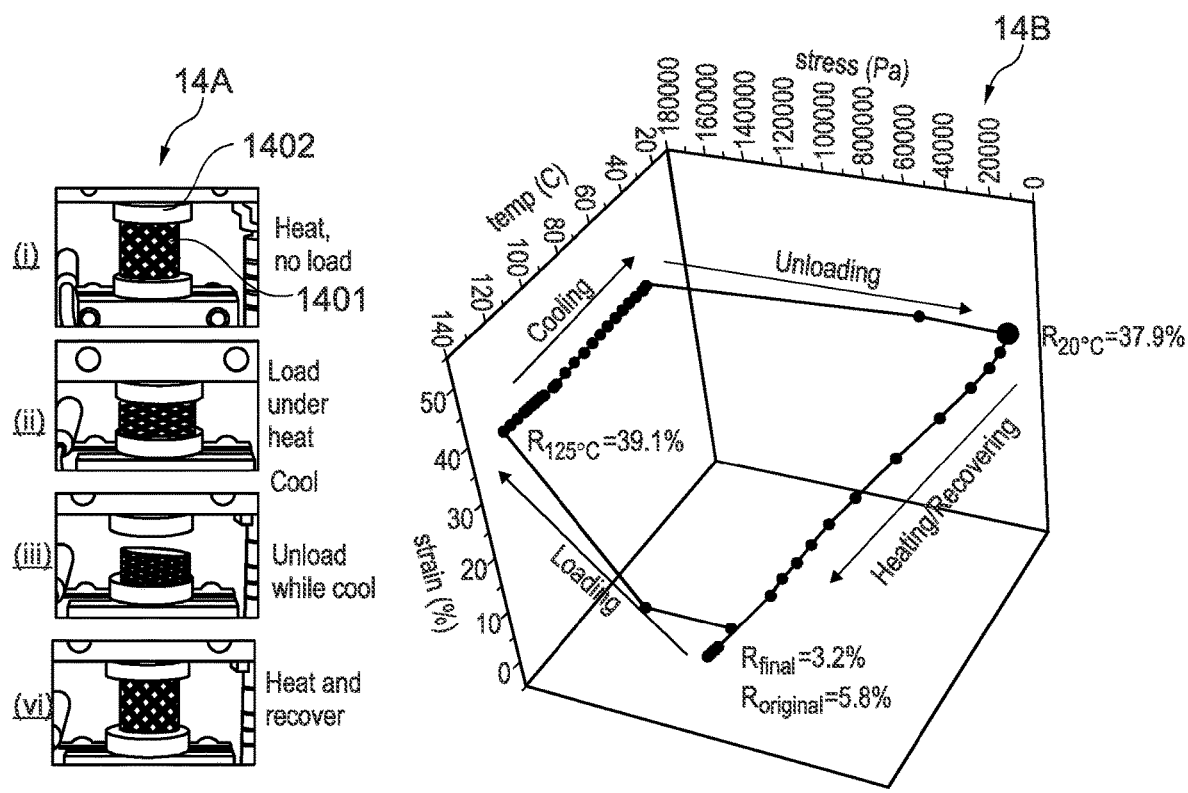
FIG. 14 is an experimental set-up and a graph showing analysis of the shape memory behaviour of a 3D printed cross-linked polymer, according to an embodiment of the invention.

Referring now to FIG. 14, there is shown an experimental rig 14A and a graph 14B showing analysis of the shape memory behaviour of a 3D printed cross-linked polymer, according to an embodiment of the invention. In the experimental set-up 14A, there is shown a cross-linked polymer sample 1401 and a rig 1402 for applying stress (Pa). The cross-linked polymer sample 1401 was produced from a resin composition comprising the prepolymer comprising second cyclic carbonate 206 (shown in FIG. 2A) and the diluent 303 according to an embodiment of the invention.

The experimental set-up 14A comprises four different stages; (i) heat, no load, wherein the cross-linked polymer sample 1401 is heated with no stress applied; (ii) load under heat, wherein the cross-linked polymer sample 1401 is heated with stress applied; (iii) unload while cool, wherein the cross-linked polymer sample 1401 is cooled with no stress applied; (iv) heat and recover, wherein the cross-linked polymer sample 1401 is heated and no stress is applied, in which time it is allowed to recover to its original shape. The graph 14B shows the data from the experimental set-up 14A through stages (i) to (iv).

Advantageously, the cross-linked polymer sample 1401 exhibits shape memory properties. More advantageously, the glass transition temperature ($T_g$) of the cross-linked polymers of the present invention is tunable. Therefore, wherein the cross-linked polymer sample 1401 is used as a medical device, the glass transition temperature ($T_g$) can be tailored for shape restoration/self-deployment of different clinical devices when inserted into the human body. For example, above the $T_g$, the polymer may enter a rubbery state in which it may be deformed into any shape. When the material is cooled below the $T_g$, the deformation is fixed and the shape remains stable. At this stage, the material lacks the rubbery elasticity and is rigid. However, the original shape may be recovered by heating the material above the $T_g$. In medical applications, this is useful because devices made of SMPs may be fitted at a temperature below the $T_g$, but when in place, the devices become softer and more comfortable inside the human body.

Figure 15:
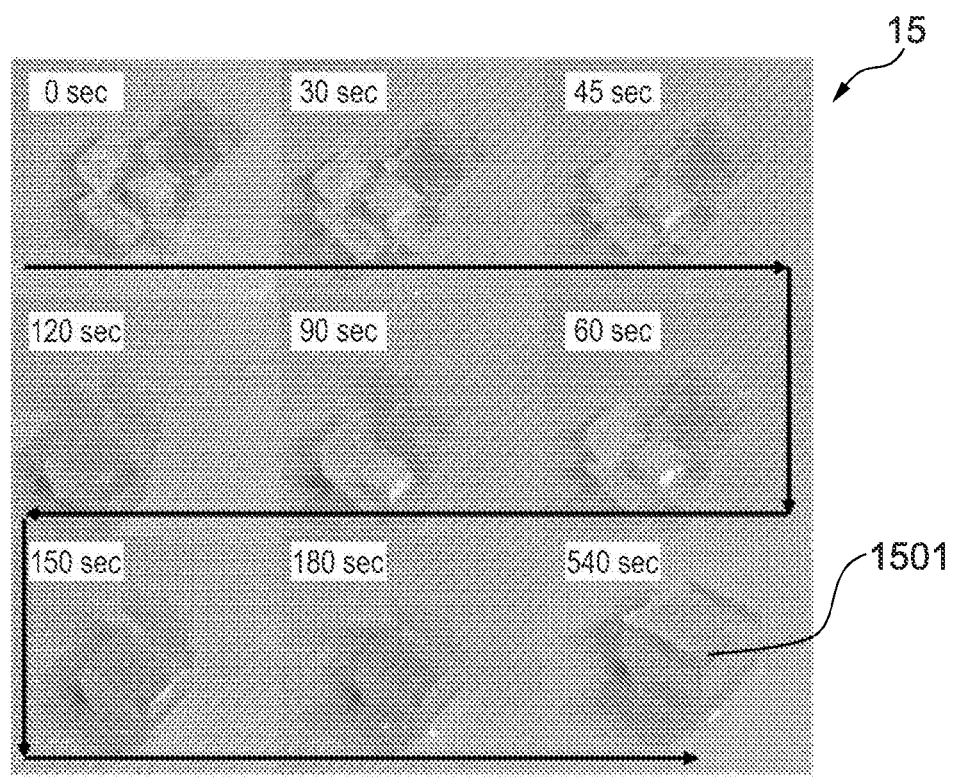
FIG. 15 is a series of photographs showing the shape recovery of a model SMP over the course of 9 minutes, according to an embodiment of the invention.

Referring also to FIG. 15, there is shown a series of photographs 15 illustrating the shape recovery of a model SMP over the course of 9 minutes, according to an embodiment of the invention. The series of photographs 15 were taken at intervals over the course of 540 seconds to show the shape recovery of a model SMP 1501. In this case, the model SMP was fabricated from a prepolymer, the prepolymer being fabricated from prepolymer 102 (FIG. 1), which was chain extended with isophorone diisocyanate 208 and cross-linked with diluent 303.

Advantageously, the cross-linked polymers 1301, 1401, and 1501 that were tested demonstrated greater than 99% strain recovery, with stresses on the order of less than 180 kPa when measured in compression using dynamic mechanical analysis with strains of approximately 40%. It was shown that strain fixity was dependent on the thermomechanical properties, as those compositions with lower glass transition temperatures ($T_g$) are not capable of maintaining a fixed shape at ambient conditions.

It was shown that prepolymers comprising only the second cyclic carbonate 206 became brittle and more likely to suffer a failure during shape memory testing under dry conditions. While this limitation disappears during solvated testing, it is a possible limitation for shape setting for applications requiring high recoverable strains. Greater compressive strains were tested using compressive mechanical testing, with these materials possessing compressibility up to ca 90% without compromising the strain recoveries.

Without wishing to be bound by any theory, it is thought that the cross-linked polymer structure (e.g. bonded covalently) defines the original or primary shape of the polymer. The presence of urethane linkages advantageously further allows the formation of hydrogen bonds within the cross-linked polymer structure. This drives fixation of the secondary shape, which enables the cross-linked polymers of the present invention to exhibit shape memory properties.

Figure 16A:
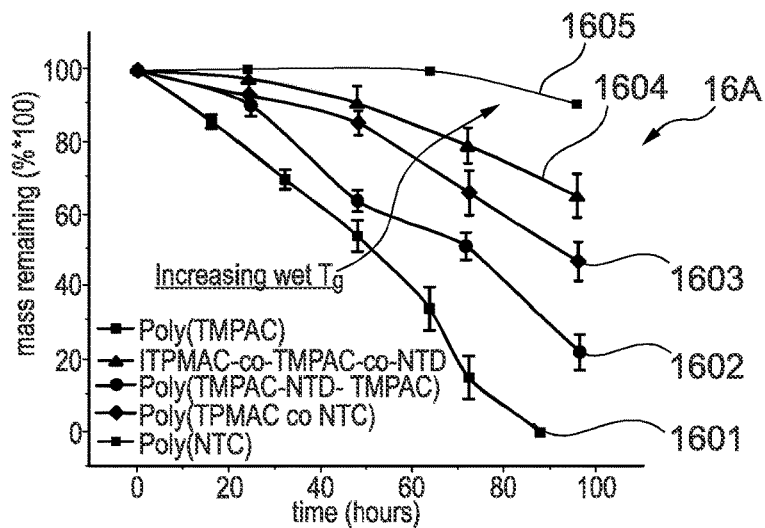
FIG. 16A is a graph showing the degradation of a series of cross-linked polymers, according to some embodiments of the invention.

Referring now to FIG. 16A, there is shown a graph 16A for the degradation of the cross-linked polymers 1601, 1602, 1603, 1604, 1605 according to some embodiments of the invention. The graph 16A shows the mass remaining (%100) of the cross-linked polymers 1601, 1602, 1603, 1604, 1605 versus time in hours, from zero to one hundred hours. The cross-linked polymers 1601, 1602, 1603, 1604, 1605 were incubated in a solution at 37° C. unless being dried or weighed.

Cross-linked polymer 1601 comprises the cross-linked polymer 604. Cross-linked polymers 1602 and 1603 each comprise a prepolymer, each prepolymer comprising different copolymers of first cyclic carbonate 202 and second cyclic carbonate 206. Cross-linked polymer 1604 comprises a cross-linked polymer comprising a prepolymer comprising second cyclic carbonate 206. Cross-linked polymer 1605 comprises the cross-linked polymer 603.

Figure 16B:
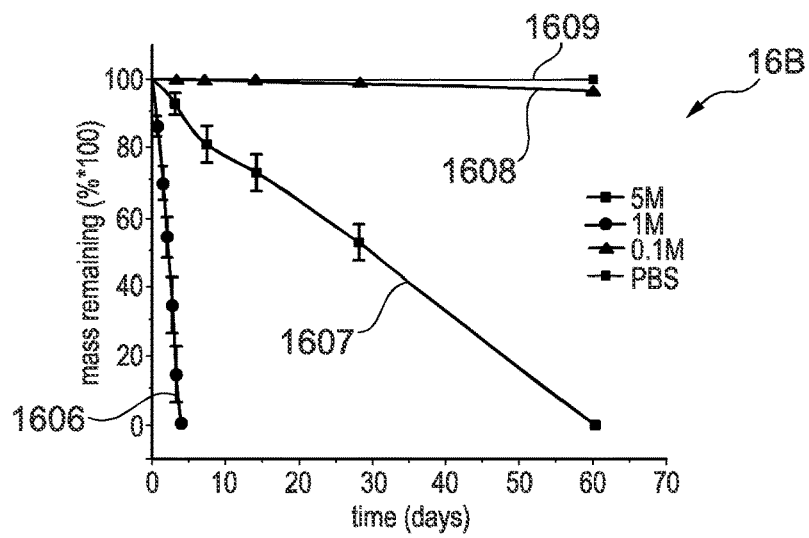
FIG. 16B is a graph showing the degradation of a cross-linked polymer, according to some embodiments of the invention.

Referring also to FIG. 16B, there is shown a graph 16B for the degradation of a cross-linked polymer according to some embodiments of the invention. The graph 16B shows the mass remaining (% 100) of the cross-linked polymer versus time in different concentrations of sodium hydroxide, and also in PBS buffer. There is shown the degradation profile of the cross-linked polymer in 5M NaOH (1606), 1M NaOH (1607), 0.1M NaOH (1608), and in PBS buffer solution (1609). The cross-linked polymer incubated in a solution at 37° C. unless being dried or weighed.

Figure 16C:
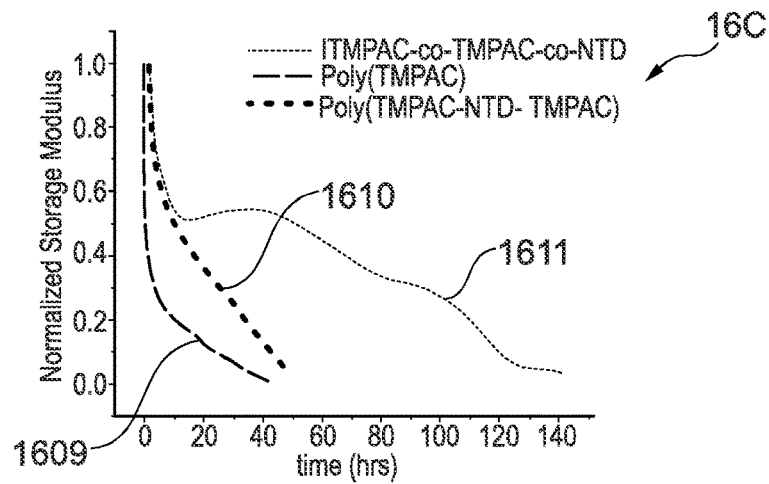
FIG. 16C is a graph showing the storage modulus versus time of a series of cross-linked polymers, according to some embodiments of the invention.

Referring also to FIG. 16C, there is shown a graph 16C showing the normalised storage modulus versus time (hours) of a series of the cross-linked polymers 1609, 1610, 1611 according to some embodiments of the invention.

The cross-linked polymer 1609 was fabricated from a prepolymer, the prepolymer comprising the first cyclic carbonate 202. The cross-linked polymer 1610 was fabricated from a prepolymer, the prepolymer comprising the first cyclic carbonate 202 and the second cyclic carbonate 206. The cross-linked polymer 1611 was fabricated from first cyclic carbonate 202 and the second cyclic carbonate 206.

The cross-linked polymers 1609, 1610, 1611 were incubated in a solution at 37° C. unless being dried or weighed. Dynamic mechanical analysis (DMA) was performed on samples in hydrolytic solution. This allowed examination of the cross-linked polymers 1609, 1610, 1611 in a simulated environment, which is advantageous if the cross-linked polymers of the present invention are to be used as load bearing biomaterials.

Advantageously, the rate of degradation, of the cross-linked polymers of the present invention may be tuned or controlled. This is achieved by modifying the resin composition to result in a different cross-linked polymer structure. For example, the diluent composition and concentration may be modified to control the rate of degradation of the resulting cross-linked polymer.

The rate of degradation is also affected by the glass transition temperature ($T_g$) and the hydrophobicity of the cross-linked polymer, which is in turn controlled by the resin composition. For example, the inclusion of the second cyclic carbonate 206 in the resin composition increases the hydrolytic stability, and also reduces swelling during degradation. In contrast, inclusion of fourth diluent 304, which is diallyl phthalate, increases the hydrolytic stability and also increases the swelling during degradation.

Figure 17A:
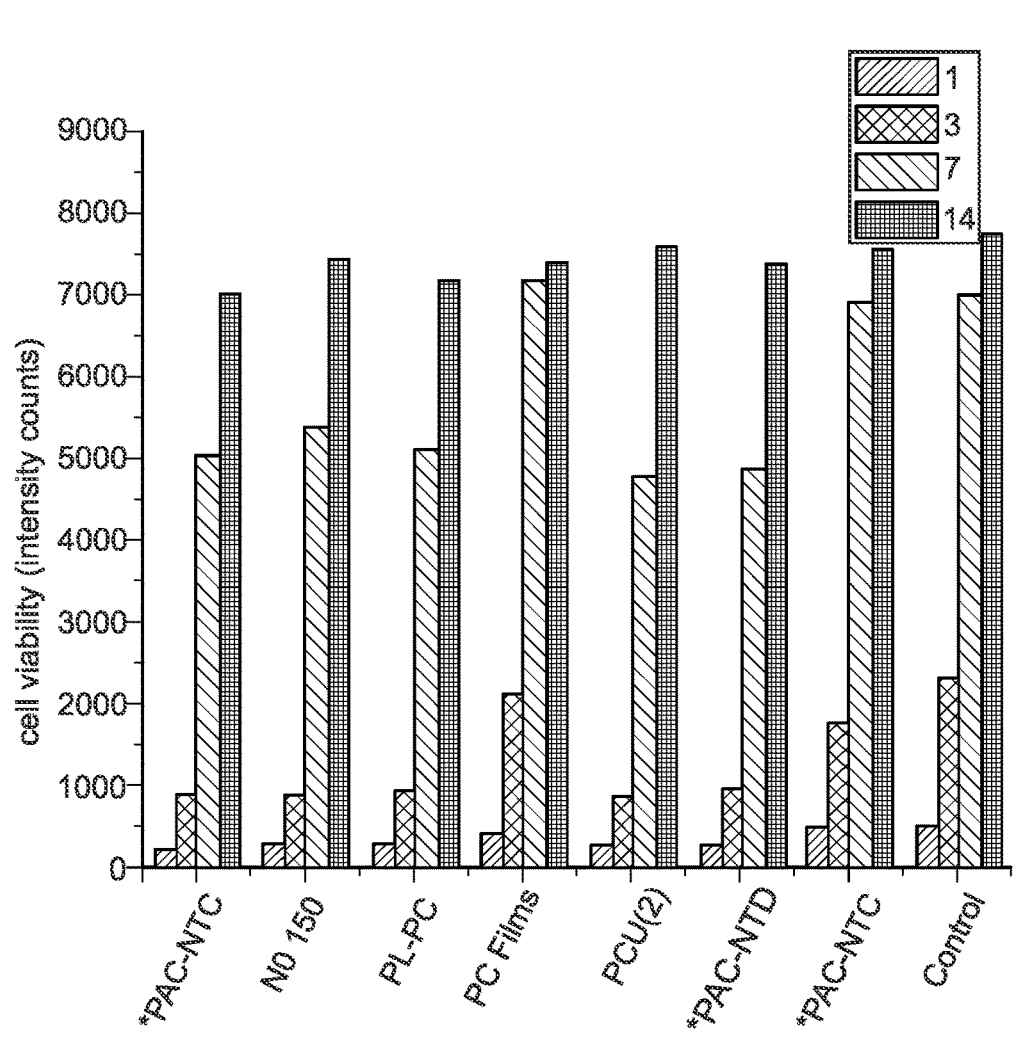
FIG. 17A is graph showing the cytocompatibility testing using pre-osteoblasts of the cross-linked polymer, according to some embodiments of the invention.

Referring first to FIG. 17A, there is shown a graph 17A showing cytocompatibility testing using pre-osteoblasts of a cross-linked polymer, according to some embodiments of the invention. Cytocompatibility testing of the cross-linked polymers according to some embodiments of the invention was performed by measuring cell viability using pre-osteoblasts on 2D surfaces and 3D surfaces. The 2D surfaces were spin-coated and compared with bare glass slides as well as PLLA films. No statistical differences were found between the surfaces at 7 and 14 days. The control films displayed greater initial compatibility at day 1 and day 3.

Figure 17B:
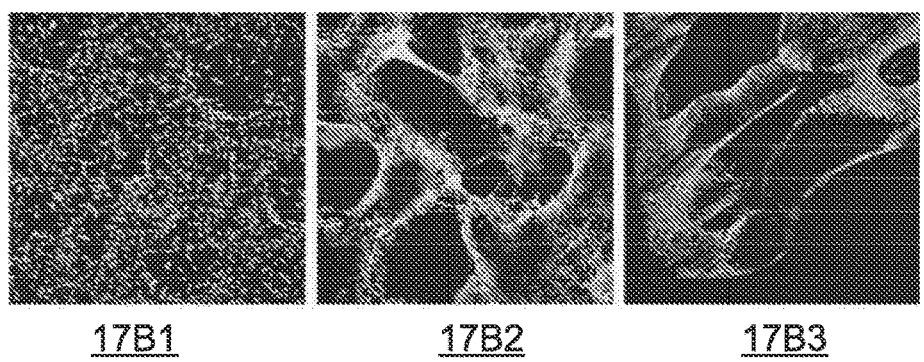
FIG. 17B is a selection of images showing the spread of cells across the cross-linked polymer, according to some embodiments of the invention.

Referring also to FIG. 17B, there is shown a selection of images 17B showing the spread of cells across the cross-linked polymer, according to some embodiments of the invention. Porous scaffolds comprising a cross-linked polymer with pore sizes ranging from 200 to 1500 μm were then printed, cleaned, and seeded with cells before incubating for 7 days. A series of images 17B1, 17B2 and 17B3 were taken at 1, 2 and 7 days respectively. The image 17B3 shows proliferation, cell spreading of cells across the porous scaffold comprising cross-linked polymer. This shows that the cross-linked polymers of the present invention have excellent biocompatibility.

Advantageously, the porous scaffolds comprising the cross-linked polymer according to an embodiment of the invention allowed for cellular infiltration and adhesion, with cells climbing the walls over the course of days to completely infiltrate the samples. No pore size was found to be superior, although qualitatively the 500 μm appeared to have the best dispersion of pre-osteoblasts.

Advantageously, the cross-linked polymers of the present invention display dry moduli values that range from 1 MPa to 2 GPa without requiring further additives or composites. At 37° C. in PBS, the moduli values are more representative for medical device applications; the range of moduli values is approximately 1 MPa to 0.8 GPa. Failure of the materials occurred more rapidly in compositions that do not possess shape memory (compositions containing only carbonate as the main chain linkage). Without wishing to be bound by theory, it is thought that the inclusion of the urethane linkages allowed for increase in strain to failure whilst providing a method of finely tuning moduli and glass transition temperature ($T_g$).

To further exemplify the invention, reference is also made to the following non-limiting Examples.

EXAMPLE 1

A prepolymer of first cyclic carbonate 202 (Prepolymer 604) was synthesised according to the protocols described in IA Barker et. al., Biomaterials Science, 2014, 2, 472-475; and also in Y He et. al., Reactive and Functional Polymers, Vol. 71, Issue 2, February 2011, p. 175-186. The $^1$H and $^{13}$C NMR spectra of Prepolymer 604 are shown in FIG. 2D.

Prepolymer 604 (1.005 g) was added to a vial (80% of ene groups, 0.005 mol). Diluent 301 (1,3,5-triallyl-1,3,5-triazine-2,4,6(1H,3H,5H)-trione), (0.312 g, 20%-ene groups, 0.001 mol) was added to the vial. Cross-linker 401 (pentaerythritol tetrakis(3-mercaptopropionate), (0.734 g, 100% thiol end groups, 0.002 mol) was added to the resin mixture. Propylene carbonate (0.615 g, 30% wt % of final resin, 0.006 mol). The mixture was mixed until homogenous. Irgacure 819® by BASF (0.020 g, 0.01 wt. % of resin composition before propylene carbonate addition) was added to the vial and mixed for 5 minutes. Curing was performed at 405 nm for 1 hour followed by 24 hour cure ramped from room temperature to 120° C. to afford the cross-linked polymer of Example 1.

EXAMPLE 2

Prepolymer 604 (5.000 g, 0.004 mol) was reacted with stoichiometric amounts of isophorone diisocyanates (0.800 g, 0.004 mol) in a chain extension reaction to form a prepolymer comprising a urethane linkage (Prepolymer of Example 2).

The resulting prepolymer comprising a urethane linkage (1.005 g) was added to a vial (80% of ene groups, 0.005 mol). Diluent 301 (1,3,5-triallyl-1,3,5-triazine-2,4,6(1H,3H,5H)-trione) (0.312 g, 20%-ene groups, 0.001 mol) was added to the vial. Cross-linker 401 (pentaerythritol tetrakis(3-mercaptopropionate) (0.734 g, 100% thiol end groups, 0.002 mol) was added to the resin composition mixture. Propylene carbonate (0.615 g, 30% wt % of final resin, 0.006 mol) was added and mixed until homogenous.

Irgacure 819® by BASF (0.020 g, 0.01% wt of resin before addition of the propylene carbonate) was added to the vial and mixed for 5 minutes. Curing was performed at 405 nm for 1 hour followed by 24 hour cure ramped from room temperature to 120° C. to afford the cross-linked polymer of Example 2.

EXAMPLE 3

Isophorone diisocyanate (7.655 g, 0.034 mol) was reacted with allyl alcohol (4.000 g, 0.034 mol) and the resulting mixture was purified to produce diluent 303. The $^1$H NMR spectrum and the $^{13}$C NMR spectrum of the diluent 303 is shown in FIG. 3B.

Prepolymer 604 (1.711 g, 0.009 mol) was added to a vial followed by diluent 303 (0.359 g, 0.001 mol) and diluent 301 (0.265 g, 0.001 mol). Cross-linker 401 (1.250 g, 0.003 mol) was added to the vial followed by propylene carbonate (30 wt. %, 1.075 g, 0.010 mol).

Irgacure 819® by BASF (0.018 g, 0.01% wt of resin before addition of the propylene carbonate) was added to the vial. Curing was performed at 405 nm for 1 hour followed by 24 hour cure ramped from room temperature to 120° C. to afford the cross-linked polymer of Example 3.

As described above, the cross-linked polymer of Example 1 and Example 3 were fabricated from a resin composition comprising a prepolymer with carbonate linkages only (the prepolymer had no urethane linkages). The urethane linkages in the cross-linked polymer of Example 1 were provided by reaction of the diluent 301 with the prepolymer 604 only. The urethane linkages in the cross-linked polymer of Example 3 were provided by reaction of diluents 301 and 303 with the prepolymer only (Prepolymer of Example 3).

In contrast, the cross-linked polymer of Example 2 was fabricated from a resin composition comprising a prepolymer with at least one urethane linkage (via the chain extension reaction with a diisocyanate). Further urethane linkages in the cross-linked polymer of Example 2 were provided by reaction of the diluent 301 with the chain extended prepolymer (Prepolymer of Example 2).

Protocol for Post-Polymerisation Functionalisation: Alkylation of Cross-Linked Polymers The solid prepolymer (100 mg) was completely immersed in acetone in a vial at room temperature. Dodecane thiol (2.000 g) was added to the vial and dissolved. Irgacure 819® by BASF (0.050 g) was dissolved in the solution.

The vial was irradiated using 405 nm for 1 hour. The resulting cross-linked polymer was removed from solution and irradiated for an additional 1 hour before allowing to dry overnight at room temperature to afford the alkylated cross-linked polymer.

Protocol for Halogenation of Cross-Linked Polymers

Protocol A: Iodine monochloride (2.000 g, 0.012 mol) was added to a solution of first cyclic carbonate 202 (2.000 g, 0.010 mol) and stirred at 60° C. for 24 hours. The resulting halogenated product was polymerised to form a prepolymer, which was subsequently used in a resin composition to fabricate a halogenated cross-linked polymer.

Protocol B: Prepolymer, e.g. prepolymer 604 (2.00 g, 0.001 mol) was added to iodine monochloride (2.000 g, 0.012 mol) and stirred at 60° C. for 24 hours. The resulting halogenated prepolymer was subsequently used in a resin composition to fabricate a halogenated cross-linked polymer.

Protocol C: The appropriate solid cross-linked polymer (100 mg) was added to a vial of iodine monochloride (2.000 g) at 50° C. and allowed to sit for 48 hours to afford a halogenated cross-linked polymer.

In summary, the resin compositions and the cross-linked polymers of the present invention exhibit a number of highly advantageous properties including:

Degradability—the cross-linked polymers of the present invention are degradable in the human body, i.e. the cross-linked polymers degrade into small molecules, which are non-toxic and may be excreted or metabolised. The rate of degradation is tunable based on the ratio of the components within the resin composition.

Biocompatible and non-toxic—advantageously, the cross-linked polymers of the present invention are biocompatible and non-toxic. In addition to the degradation products being non-toxic, the synthesis of any of the components of the resin composition, and/or the synthesis of the cross-linked polymer itself does not use any toxic reagents or catalysts, e.g. tin catalysts and so on.

Shape memory properties—the cross-linked polymers of the present invention exhibit shape memory properties.

Without wishing to be bound by theory, it is believed that the urethane linkages in the cross-linked polymer impart particularly advantageous shape memory properties, and the polycarbonate linkages impart degradability to the material. These properties are advantageous for use of the cross-linked polymers in devices for medical applications.

Processability—the resin compositions of the present invention are suitable for processing into a variety of geometries that allow for spatiotemporal control of their behaviour. The morphology and the porosity, i.e. the pore size, pore density, can be controlled and reproduced. Advantageously, the cross-linked polymers comprise homogeneous structures, both in terms of bulk morphology and composition. The cross-linked polymers can be repeatedly and rapidly manufactured into a range of sizes allowing for the same device to be patterned across a series of sizes. The resin compositions of the present invention exhibit an appropriate viscosity for use in 3D printing using microstereolithographic apparatus.

Tunability of properties—The resin composition may be varied to tune the properties of the resulting cross-linked polymer. For example, the type and concentration of the prepolymer and/or the diluent and/or the cross-linker may be adjusted to tune the shape memory properties, the biocompatibility, the glass transition temperature ($T_g$), the degradation rate, the strain recovery, and other physiochemical and thermomechanical properties of the cross-linked polymer. The structure of the prepolymer may be varied to tune the properties of the resulting cross-linked polymer, i.e. by using different types and/or concentrations of monomer to fabricate the prepolymer.

Further functionalisation of the cross-linked polymer—Post-polymerisation, the unsaturated side-chains may be functionalised to introduce functionality that is not compatible with the cross-linking process, e.g. microstereolithography. The post-polymerisation functionality enables the cross-linked polymer to exhibit other advantageous properties, e.g. increased x-ray density, and increase hydrophobicity. The unsaturated side-chains may also be functionalised with biomolecules for recognition, for example.

It will also be appreciated by those skilled in the art that any number of combinations of the aforementioned features and/or those shown in the appended drawings provide clear advantages over the prior art and are therefore within the scope of the invention described herein.

The invention claimed is:

1. A resin composition, the resin composition comprising a prepolymer and at least one diluent, the prepolymer comprising repeating units having at least one carbonate linkage and at least one unsaturated side-chain, said at least one diluent(s) comprising at least one unsaturated side chain, wherein either the prepolymer comprises at least one O=C—N linkage or said at least one diluent comprises at least one O=C—N linkage but not both the prepolymer and said at least one diluent comprises at least one O=C—N linkage.

2. A resin composition according to claim 1, wherein the prepolymer comprises at least one O═C—N linkage.

3. A resin composition according to claim 1, wherein the at least one O═C—N linkage is a urethane linkage.

4. A resin composition according to claim 1, the prepolymer comprising repeating units having at least one carbonate linkage, at least one urethane linkage, and at least one unsaturated side-chain.

5. A resin composition according to claim 2, further comprising a cross-linker, the cross-linker comprising a moiety that is capable of reacting with the at least one unsaturated side-chain of the prepolymer and/or the at least one diluent.

6. A resin composition according to claim 5, wherein the cross-linker has the formula (vi):

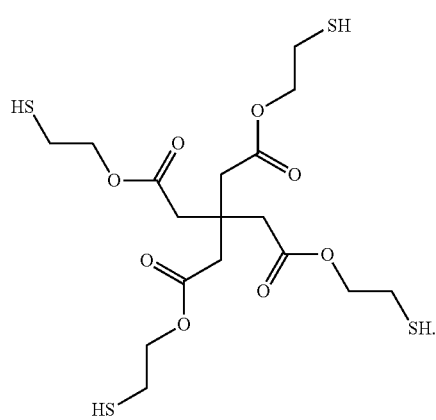

(vi)

7. A resin composition according to claim 2, wherein the at least one diluent comprises plural unsaturated side-chains.

8. A resin composition according to claim 2, wherein the at least one diluent is selected from the following (ii) to (v):

(ii)

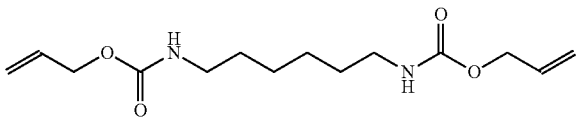

(iii)

(iv)

(v)

9. A resin composition according to claim 1, wherein the prepolymer has the formula (vii):

(vii)

wherein R group is an aliphatic or an aromatic moiety, $R^1$ is an aliphatic or an aromatic moiety, $R^2$ is an aliphatic or an aromatic moiety, $R^3$ is an aliphatic or an aromatic moiety, and $R^4$ is an aliphatic or an aromatic moiety, and wherein x is a number that is less than one hundred.

10. A resin composition, the resin composition comprising a prepolymer, the prepolymer comprising repeating units having at least one carbonate linkage and at least one unsaturated side-chain, wherein the prepolymer comprises at least one O═C—N linkage and has the formula (viii):

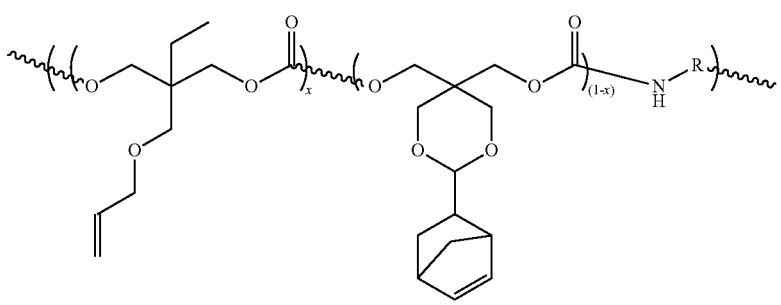

(viii)

wherein R group is an aliphatic or an aromatic moiety, $R^1$ is an aliphatic or an aromatic moiety, $R^2$ is an aliphatic or an aromatic moiety, $R^3$ is an aliphatic or an aromatic moiety, and $R^4$ is an aliphatic or an aromatic moiety, and wherein x is a number that is less than one hundred.

11. A resin composition according to claim 1, wherein the prepolymer is fabricated from components comprising the formulae (ix):

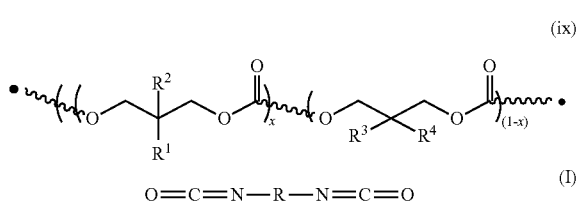

(ix)

O═C═N—R—N═C═O   (I)

wherein R group is an aliphatic or an aromatic moiety, $R^1$ is an aliphatic or an aromatic moiety, $R^2$ is an aliphatic or an aromatic moiety, $R^3$ is an aliphatic or an aromatic moiety, and $R^4$ is an aliphatic or an aromatic moiety, and wherein x is a number that is less than one hundred.

12. A resin composition according to claim 5, wherein the prepolymer is present in a quantity of between 10 and 100 w/w % of the total composition, the diluent is present in a quantity of between 0 and 50 w/w % of the total composition, and the cross-linker is present in a quantity of between 0 and 50 w/w % of the total composition.

13. A cross-linked polymer comprising a resin composition of claim 1 which has been cross linked.

14. A method of fabricating a cross-linked polymer, the method comprising:
   i. providing a resin composition according to claim 1.

15. A method according to claim 14, comprising:
   ii. contacting the resin composition with a initiator; and
   iii. providing an energy source to activate the initiator.

16. A method according to claim 15, comprising contacting the resin composition with a photoinitiator and exposing the resin composition to a light source, for example, UV light.

17. A method according to claim 15, wherein the initiator is present in a quantity of between 0 and 5 w/w% of the total composition.

18. A method according claim 15, comprising forming the cross-linked polymer by stereolithography.

19. A method according to claim 15, the method further comprising step iv. providing a reagent for halogenation of the at least one unsaturated side chain.

20. A method according to claim 15, further comprising a further step selected from one or more of the following group:
   step v. providing a reagent for alkylation of the at least one unsaturated side chain;
   step vi. providing a reagent for functionalising the at least one unsaturated side chain with a hydrophobic moiety;
   step vii. providing a reagent for functionalising the at least one unsaturated side chain with a cell adhesion moiety.

21. A resin composition according to claim 1, wherein said at least one diluent comprises at least one O═C—N linkage.

22. A resin composition, the resin composition comprising a prepolymer and at least one diluent, said at least one diluent(s) comprising at least one unsaturated side chain and at least one O═C—N linkage, the prepolymer comprising repeating units having at least one carbonate linkage and at least one unsaturated side-chain, wherein the prepolymer is fabricated by polymerisation of monomer 202;

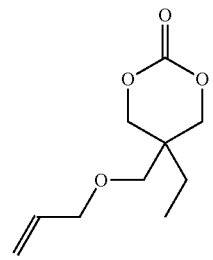

202 and wherein the prepolymer comprises the repeating unit shown in formula;

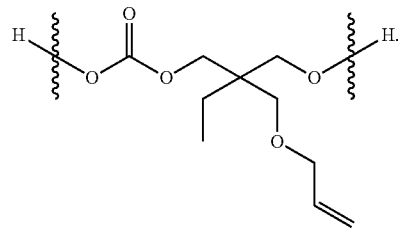

* * * * *